US009184806B2

(12) United States Patent
Kim et al.

(10) Patent No.: US 9,184,806 B2
(45) Date of Patent: Nov. 10, 2015

(54) METHOD FOR PERFORMING HIERARCHICAL BEAMFORMING IN WIRELESS ACCESS SYSTEM AND DEVICE THEREFOR

(71) Applicant: LG ELECTRONICS INC., Seoul (KR)

(72) Inventors: Jinmin Kim, Anyang-si (KR); Sunam Kim, Anyang-si (KR); Binchul Ihm, Anyang-si (KR); Hyukmin Son, Anyang-si (KR); Jaehoon Chung, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/382,517

(22) PCT Filed: Mar. 7, 2013

(86) PCT No.: PCT/KR2013/001850

§ 371 (c)(1),
(2) Date: Sep. 2, 2014

(87) PCT Pub. No.: WO2013/133645

PCT Pub. Date: Sep. 12, 2013

(65) Prior Publication Data

US 2015/0049824 A1 Feb. 19, 2015

Related U.S. Application Data

(60) Provisional application No. 61/607,594, filed on Mar. 7, 2012, provisional application No. 61/612,385, filed on Mar. 18, 2012, provisional application No. 61/621,979, filed on Apr. 9, 2012, provisional application No. 61/639,086, filed on Apr. 27, 2012.

(51) Int. Cl.
*H04B 7/02* (2006.01)
*H04L 1/02* (2006.01)

(Continued)

(52) U.S. Cl.
CPC ............ *H04B 7/0408* (2013.01); *H04B 7/0417* (2013.01); *H04B 7/0456* (2013.01); *H04B 7/061* (2013.01); *H04B 7/0617* (2013.01); *H04W 16/28* (2013.01)

(58) Field of Classification Search
CPC .... H04B 7/0408; H04B 7/0417; H04B 7/061; H04B 7/0456; H04B 7/0617; H04W 16/28
USPC ............................................................ 375/267
See application file for complete search history.

(56) References Cited

U.S. PATENT DOCUMENTS

2006/0104382 A1* 5/2006 Yang et al. .................... 375/267
2007/0016050 A1* 1/2007 Moehring et al. ............ 600/454

(Continued)

FOREIGN PATENT DOCUMENTS

KR 10-2010-0111322 10/2010
KR 10-2010-0132071 12/2010

(Continued)

OTHER PUBLICATIONS

PCT International Application No. PCT/KR2013/001850, Written Opinion of the International Searching Authority dated Jun. 14, 2013, 1 page.

*Primary Examiner* — Erin File
(74) *Attorney, Agent, or Firm* — Lee, Hong, Degerman, Kang & Waimey

(57) ABSTRACT

A method for performing hierarchical beamforming in a wireless access system and a device therefor are disclosed. Particularly, the method comprises: an initial step for allowing a base station to transmit a plurality of first beams, to which different steering vectors are applied, to a terminal through corresponding reference signals, and a repetition step for allowing the base station to transmit a plurality of second beams, to which different steering vectors are applied, to the terminal through corresponding reference signals by considering feedback information that contains an index of one or more beams received from the terminal, wherein the repetition step can be repeated up to a predetermined number of times.

16 Claims, 19 Drawing Sheets

(51) Int. Cl.
*H04B 7/04* (2006.01)
*H04B 7/06* (2006.01)
*H04W 16/28* (2009.01)

(56) References Cited

U.S. PATENT DOCUMENTS

2010/0164804 A1* 7/2010 Xu et al. ........................ 342/372
2010/0215027 A1* 8/2010 Liu et al. ........................ 370/338
2010/0265925 A1* 10/2010 Liu et al. ........................ 370/336
2012/0220333 A1* 8/2012 Zhu ................................ 455/525

FOREIGN PATENT DOCUMENTS

KR 10-2011-0014187 2/2011
KR 10-2011-0069176 6/2011
KR 10-2011-0129481 12/2011

* cited by examiner (a) (b)

METHOD FOR PERFORMING HIERARCHICAL BEAMFORMING IN WIRELESS ACCESS SYSTEM AND DEVICE THEREFOR

CROSS-REFERENCE TO RELATED APPLICATIONS

This application is the National Stage filing under 35 U.S.C. 371 of International Application No. PCT/KR2013/001850, filed on Mar. 7, 2013, which claims the benefit of U.S. Provisional Application Serial Nos. 61/607,594, filed on Mar. 7, 2012, 61/612,385, filed on Mar. 18, 2012, 61/621,979, filed on Apr. 9, 2012 and 61/639,086, filed on Apr. 27, 2012, the contents of which are all hereby incorporated by reference herein in their entirety.

TECHNICAL FIELD

The present invention relates to a wireless access system, and more particularly, to a method for performing beamforming in a wireless access system that supports massive multi-input multi-output (MIMO), and a device supporting the same.

BACKGROUND ART

Many schemes based on multiple antennas have been studied to improve link quality between a transmitter and a receiver and support a high data transmission rate in accordance with requirements of a next generation wireless access system. Schemes such as space frequency block coding (SFBC), spatial multiplexing (SM), closed-loop MIMO (CL-MIMO)/beamforming and zero-forcing beamforming (ZFBF) have been applied to LTE or LTE-A system.

Generally, a mobile communication system considers that more antennas are installed in a base station than a user equipment for a reason of physical space and power supply, and the current LTE-A system (release-10) supports maximum 8 Tx system. Among methods for improving link quality by using multiple antennas, in case that channel state information may be used by a transmitter, a beamforming scheme may provide the most excellent throughput. The beamforming scheme may obtain gain for reducing a transmission power or more improved link quality if the number of transmitting antennas is increased. Also, as the number of antennas is increased, beam may be formed sharply and at the same time more orthogonal beams may be generated. In other words, the number of receivers, which may receive their respective data at the same time, is increased. In this respect, a system, which supports large scaled antennas more than the existing 8 Tx antennas, that is, massive MIMO system is considered.

DISCLOSURE

Technical Problem

An object of the present invention is to provide a method for desirably performing beamforming between a user equipment and a base station in a wireless access system, preferably a wireless access system that supports massive multi-input multi-output (MIMO), and a device supporting the same.

It will be appreciated by persons skilled in the art that the objects that could be achieved with the present invention are not limited to what has been particularly described herein-above and the above and other objects that the present invention could achieve will be more clearly understood from the following detailed description.

Technical Solution

In one aspect of the present invention, a method for performing hierarchical beamforming in a wireless access system comprises an initial step for allowing a base station to transmit a plurality of first beams, to which different steering vectors are applied, to a user equipment through corresponding reference signals; and a repetition step for allowing the base station to transmit a plurality of second beams, to which different steering vectors are applied, to the user equipment through corresponding reference signals by considering feedback information that includes indexes of one or more beams received from the user equipment, wherein the repetition step may be repeated as much as a predetermined number of times.

In another aspect of the present invention, a base station for performing hierarchical beamforming in a wireless access system comprises a radio frequency (RF) unit configured to transmit and receive a radio signal; and a processor, wherein the processor is configured to perform an initial step for transmitting a plurality of first beams, to which different steering vectors are applied, to a user equipment through corresponding reference signals, and perform a repetition step for transmitting a plurality of second beams, to which different steering vectors are applied, to the user equipment through corresponding reference signals by considering feedback information that includes indexes of one or more beams received from the user equipment, and the repetition step may be repeated as much as a predetermined number of times.

Preferably, angles of the second beams may be determined in accordance with angles of the one or more beams.

Preferably, the feedback information may further include at least any one of signal strength on the one or more beams, channel quality information (CQI), and precoding matrix indication (PMI).

Preferably, if the feedback information includes the PMI, the PMI may be determined on the basis of the first beams or the second beams, or may be determined on the basis of one or beams selected by the user equipment through signal strength of the beams.

Preferably, if the feedback information includes signal strength on a plurality of beams, angles of the second beams may be determined at an unequal interval by considering signal strength on the plurality of beams.

Preferably, the first beams or the second beams may be generated using antenna ports only having a predetermined interval, may be generated using antenna ports grouped per a predetermined number, or may be generated by being grouped per a predetermined number.

Preferably, the reference signal may be a channel state information reference signal (CSI-RS).

In still another aspect of the present invention, a method for performing hierarchical beamforming in a wireless access system comprises allowing a user equipment to receive parameters including a step size for the hierarchical beamforming and the number of beams at each step for the hierarchical beamforming from a base station; an initial step for allowing the user equipment to transmit a plurality of first beams, to which different steering vectors are applied, to the base station through corresponding reference signals; and a repetition step for allowing the user equipment to transmit a plurality of second beams, to which different steering vectors are applied, to the base station through corresponding reference signals by considering feedback information that includes indexes of one or more beams received from the base station, wherein the repetition step may be repeated as much as the step size.

In further still another aspect of the present invention, a user equipment for performing hierarchical beamforming in a wireless access system comprises a radio frequency (RF) unit configured to transmit and receive a radio signal; and a processor, wherein the processor is configured to receive parameters including a step size for the hierarchical beamforming and the number of beams at each step for the hierarchical beamforming from a base station, perform an initial step for transmitting a plurality of first beams, to which different steering vectors are applied, to the base station through corresponding reference signals, and perform a repetition step for transmitting a plurality of second beams, to which different steering vectors are applied, to the base station through corresponding reference signals by considering feedback information that includes indexes of one or more beams received from the base station, and the repetition step may be repeated as much as the step size.

Preferably, angles of the second beams may be determined in accordance with angles of the one or more beams.

Preferably, the feedback information may further include at least any one of signal strength on the one or more beams, channel quality information (CQI), and precoding matrix indication (PMI).

Preferably, if the feedback information includes the PMI, the PMI may be determined on the basis of the first beams or the second beams, or may be determined on the basis of one or beams selected by the base station through signal strength of the beams.

Preferably, if the feedback information includes signal strength on a plurality of beams, angles of the second beams may be determined at an unequal interval by considering signal strength on the plurality of beams.

Preferably, the first beams or the second beams may be generated using antenna ports only having a predetermined interval, may be generated using antenna ports grouped per a predetermined number, or may be generated by being grouped per a predetermined number.

Preferably, the reference signal may be a channel state information reference signal (CSI-RS).

Advantageous Effects

According to the embodiment of the present invention, beamforming may be performed desirably between a user equipment and a base station in a wireless access system, preferably a wireless access system that supports massive multi-input multi-output (MIMO).

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Figure 1:
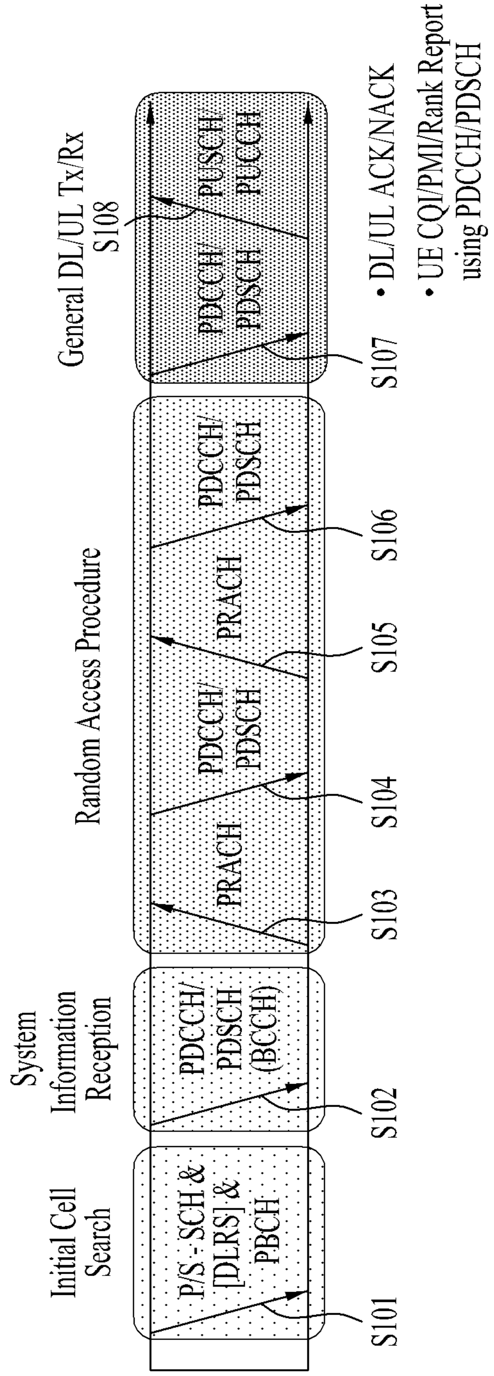
FIG. 1 is a diagram illustrating physical channels used in a 3GPP LTE system and a general method for transmitting a signal using the physical channels.

Hereinafter, the preferred embodiments of the present invention will be described in detail with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters.

In some cases, to prevent the concept of the present invention from being ambiguous, structures and apparatuses of the known art will be omitted, or will be shown in the form of a block diagram based on main functions of each structure and apparatus.

In this specification, the embodiments of the present invention have been described based on the data transmission and reception between a base station and a user equipment. In this case, the base station means a terminal node of a network, which performs direct communication with the user equipment. Herein, a specific operation which has been described as being performed by the base station may be performed by an upper node of the base station as the case may be. In other words, it will be apparent that various operations performed for communication with the user equipment in the network which includes a plurality of network nodes along with the base station may be performed by the base station or network nodes other than the base station. The base station (BS) may be replaced with terms such as a fixed station, Node B, eNode B (eNB), and an access point (AP). A relay may be replaced with terms such as relay node (RN) and relay station (RS). Also, terminal may be replaced with terms such as a user equipment (UE), a mobile station (MS), a mobile subscriber station (MSS), a subscriber station (SS), an advanced mobile station (AMS), a wireless terminal (WT), a machine-type communication (MTC) device, a machine-to-machine (M2M) device, and a device-to-device (D2D) device.

Specific terminologies used in the following description are provided to assist understanding of the present invention, and various modifications may be made in the specific terminologies within the range that they do not depart from technical spirits of the present invention.

The embodiments of the present invention may be supported by standard documents disclosed in at least one of wireless access systems, i.e., IEEE 802.xx system, 3GPP system, 3GPP LTE system, and 3GPP2 system. Namely, among the embodiments of the present invention, steps or parts which are not described to clarify the technical spirits of the present invention may be supported by the above standard documents. Also, all terminologies disclosed herein may be described by the above standard documents.

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE.

For clarification of the description, although the following embodiments will be described based on the 3GPP LTE/LTE-A, it is to be understood that the technical spirits of the present invention are not limited to the 3GPP LTE/LTE-A.

3GPP LTE/LTE-A System to which the Present Invention May be Applied

FIG. 1 is a diagram illustrating physical channels used in a 3GPP LTE system and a general method for transmitting a signal using the physical channels.

The user equipment, of which power is turned on, or which newly enters a cell, performs initial cell search such as synchronizing with the base station at step S101. To this end, the user equipment synchronizes with the base station by receiving a primary synchronization channel (P-SCH) and a secondary synchronization channel (S-SCH) from the base station, and acquires information such as cell ID, etc.

Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink control channel (PDCCH) and a physical downlink shared channel (PDSCH) based on the PDCCH at step S102.

Afterwards, the user equipment may perform a random access procedure (RACH) such as steps S103 to S106 to complete access to the base station. To this end, the user equipment may transmit a preamble through a physical random access channel (PRACH) (S103), and may receive a response message to the preamble through the PDCCH and the PDSCH corresponding to the PDCCH (S104). In case of a contention based RACH, the user equipment may perform a contention resolution procedure such as transmission (S105) of additional physical random access channel and reception (S106) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S107) and transmit a physical uplink shared channel (PUSCH) and a physical uplink control channel (PUCCH) (S108), as a general procedure of transmitting uplink/downlink signals.

Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CQI (channel quality indicator), PMI (precoding matrix indicator), RI (rank indication) information, etc.

Although the UCI is generally transmitted through the PUCCH in the LTE system, it may be transmitted through the PUSCH if control information and traffic data should be transmitted at the same time. Also, the user equipment may non-periodically transmit the UCI through the PUSCH in accordance with request/command of the network.

Figure 2:
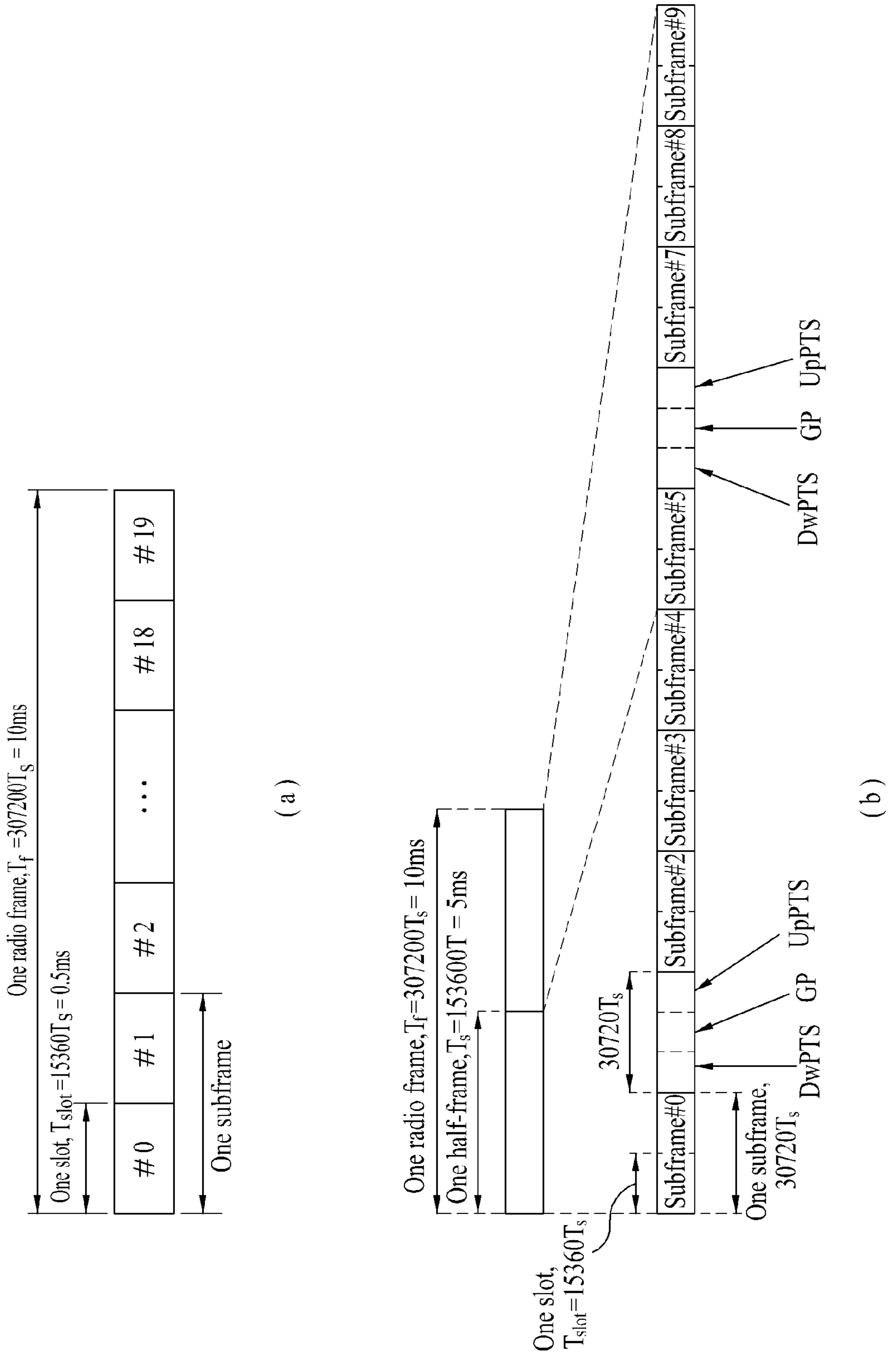
FIG. 2 is a diagram illustrating a structure of a radio frame used in a 3GPP LTE system.

FIG. 2 is a diagram illustrating a structure of a radio frame in a 3GPP LTE.

In a cellular OFDM wireless packet communication system, uplink/downlink data packet transmission is performed in a subframe unit, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 2(*a*) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols is intended to express one symbol interval. The OFDM symbols may be referred to as one SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP).

Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first maximum three OFDM symbols of the subframe may be allocated to a physical downlink control channel (PDCCH), and the other OFDM symbols may be allocated to a physical downlink shared channel (PDSCH).

FIG. 2(*b*) is a diagram illustrating a structure of a type 2 radio frame. The type 2 radio frame includes two half frames, each of which includes five subframes, a downlink pilot time slot (DwPTS), a guard period (GP), and an uplink pilot time slot (UpPTS). One of the five subframes includes two slots. The DwPTS is used for initial cell search, synchronization or channel estimation at the user equipment. The UpPTS is used to synchronize channel estimation at the base station with uplink transmission of the user equipment. Also, the guard period is to remove interference occurring in the uplink due to multipath delay of downlink signals between the uplink and the downlink.

The aforementioned structure of the radio frame is only exemplary, and various modifications may be made in the number of subframes included in the radio frame or the number of slots included in the subframe, or the number of symbols included in the slot.

Figure 3:
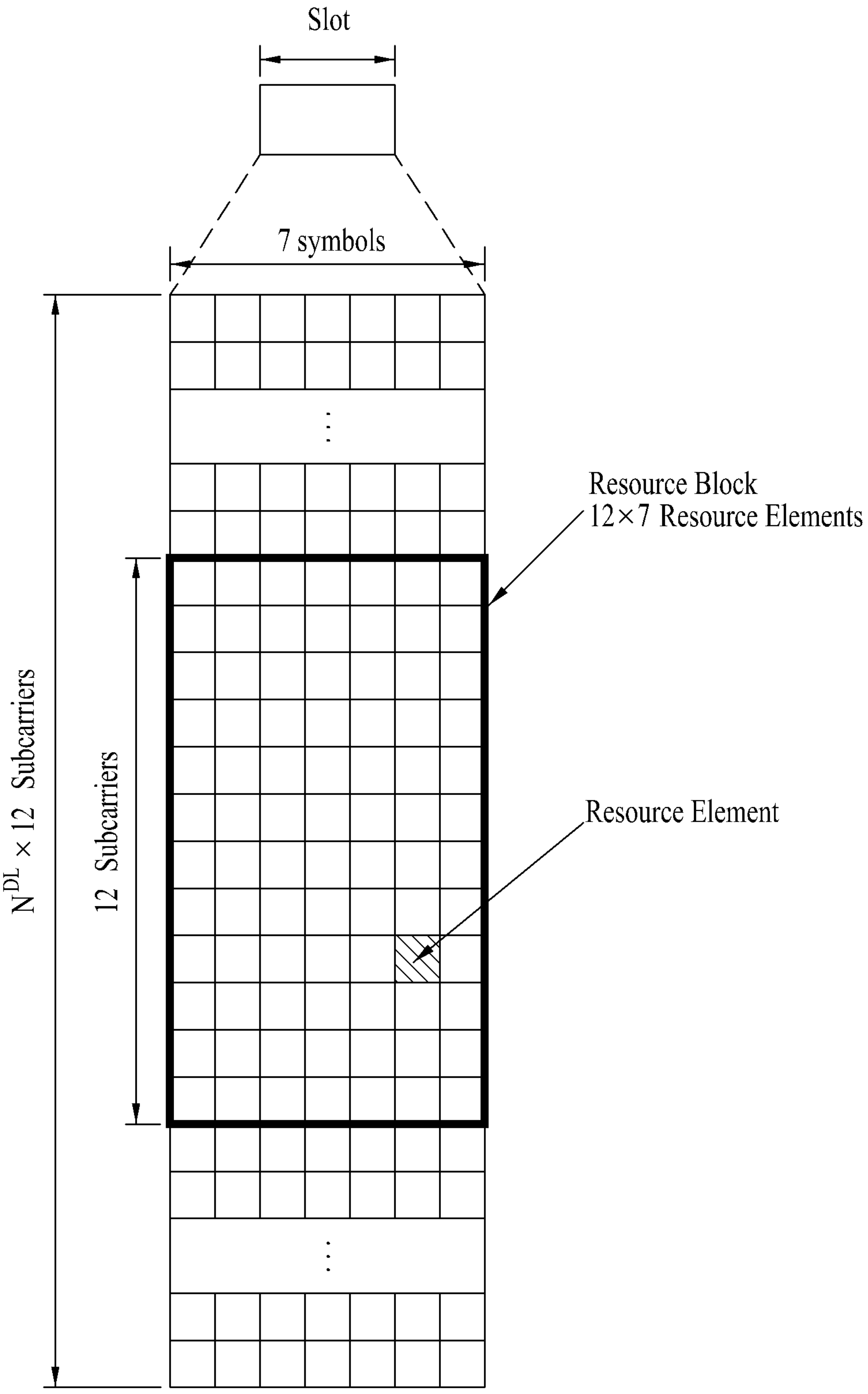
FIG. 3 is a diagram illustrating an example of a resource grid of one downlink slot.

FIG. 3 is a diagram illustrating a resource grid for a downlink slot used in an LTE system.

Referring to FIG. 3, one downlink slot includes a plurality of OFDM symbols in a time domain. In this case, one downlink slot includes, but not limited to, seven OFDM symbols, and one resource block (RB) includes, but not limited to, twelve subcarriers in a frequency domain.

Each element on the resource grid will be referred to as a resource element (RE). One resource block (RB) includes 12×7 resource elements. The number $N^{DL}$ of resource blocks (RBs) included in the downlink slot depends on a downlink transmission bandwidth. A structure of an uplink slot may be the same as that of the downlink slot.

Figure 4:
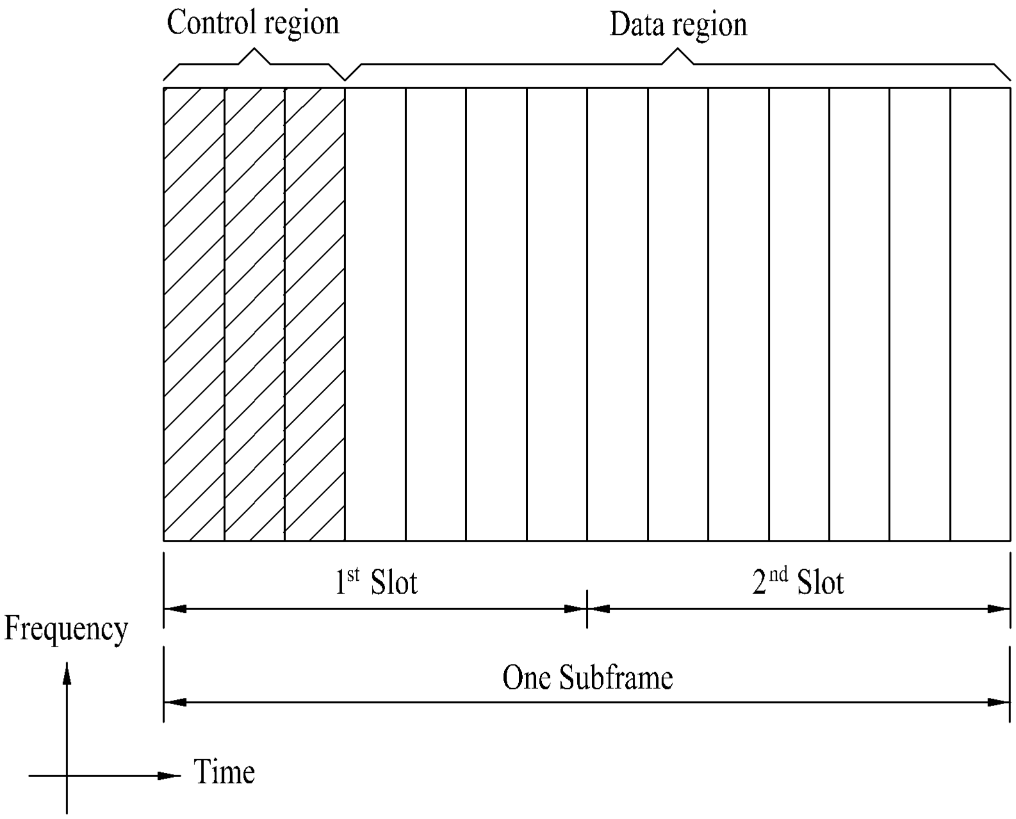
FIG. 4 is a diagram illustrating a structure of a downlink subframe.

FIG. 4 is a diagram illustrating a structure of a downlink subframe.

Referring to FIG. 4, maximum three OFDM symbols located at the front of the first slot within one subframe correspond to a control region to which control channels are allocated. The other OFDM symbols correspond to a data region to which a physical downlink shared channel (PDSCH) is allocated. Examples of the downlink control channel used in the 3GPP LTE include a PCFICH (Physical Control Format Indicator CHannel), a PDCCH (Physical Downlink Control CHannel), and a PHICH (Physical Hybrid ARQ Indicator CHannel).

The PCFICH is transmitted from the first OFDM symbol of the subframe, and carries information on the number (that is, size of the control region) of OFDM symbols used for transmission of the control channels within the subframe. The PHICH is a response channel to uplink transmission, and carries HARQ ACK/NACK (acknowledgement/negative-acknowledgement) signal. The control information transmitted through the PDCCH will be referred to as downlink control information (DCI). The downlink control information (DCI) includes uplink resource allocation information, downlink resource allocation information, or uplink transmission (Tx) power control command for a random user equipment group.

The PDCCH may carry resource allocation and transport format (that may be referred to as downlink grant) of a downlink shared channel (DL-SCH), resource allocation information (that may be referred to as uplink grant) of an uplink shared channel (UL-SCH), paging information on a paging channel (PCH), system information on the DL-SCH, resource allocation information of upper layer control message such as random access response transmitted on the PDSCH, a set of transmission power control commands of individual user equipments (UEs) within a random user equipment group, and activity indication information of voice over Internet protocol (VoIP). A plurality of PDCCHs may be transmitted within the control region, and the user equipment may monitor the plurality of PDCCHs. The PDCCH is configured by aggregation of one or a plurality of continuous control channel elements (CCEs). The CCE is a logic allocation unit used to provide the PDCCH with a coding rate based on the status of a radio channel. The CCE corresponds to a plurality of resource element groups (REGs). The format of the PDCCH and the number of available bits of the PDCCH are determined depending on the correlation between the number of CCEs and the coding rate provided by the CCEs.

The base station determines a PDCCH format depending on the DCI which will be transmitted to the user equipment, and attaches cyclic redundancy check (CRC) to the control information. The CRC is masked with a unique identifier (for example, radio network temporary identifier (RNTI)) depending on usage of the PDCCH or owner of the PDCCH. For example, if the PDCCH is for a specific user equipment, the CRC may be masked with cell-RNTI (C-RNTI) of the corresponding user equipment. If the PDCCH is for a paging message, the CRC may be masked with a paging indication identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI) to indicate a random access response which is a response to transmission of a random access preamble.

Figure 5:
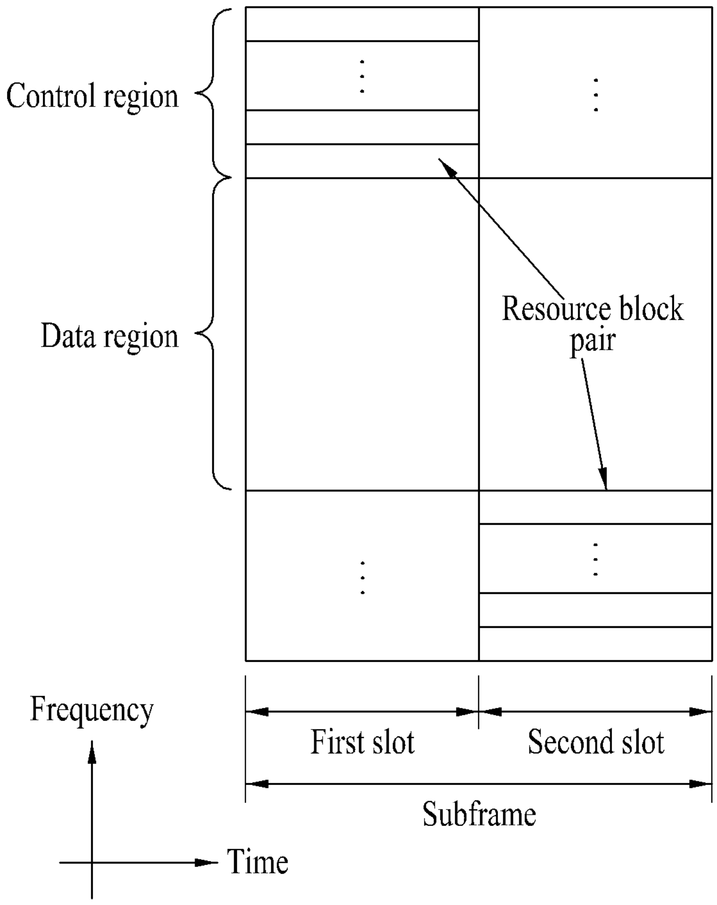
FIG. 5 is a diagram illustrating a structure of an uplink subframe.

FIG. 5 is a diagram illustrating a structure of an uplink subframe.

Referring to FIG. 5, the uplink subframe may be divided into a control region and a data region in a frequency domain. A physical uplink control channel (PUCCH) which carries uplink control information is allocated to the control region. A physical uplink shared channel (PUSCH) which carries user data is allocated to the data region. In order to maintain single carrier features, one user equipment does not transmit the PUCCH and the PUSCH at the same time. A resource block (RB) pair for the subframe is allocated to the PUCCH for one user equipment. Resource blocks (RBs) belonging to the RB pair reserve their respective subcarriers different from each other at each of two slots. The RB pair allocated to the PUCCH is subjected to frequency hopping at a slot boundary.

Downlink Reference Signal and Downlink Measurement

When a packet (or signal) is transmitted in the wireless communication system, signal distortion may occur during transmission of the packet because the packet is transmitted through a radio channel. In order to normally receive the distorted signal, a receiver should compensate distortion of the received signal by using channel information. In order to discover the channel information, it is required to transmit the signal known by both a transmitter and the receiver and discover the channel information using a distortion level of the signal when the signal is transmitted through the channel. In this case, the signal known by both the transmitter and the receiver will be referred to as a pilot signal or a reference signal.

In case that the transmitter or the receiver of the wireless communication system transmits and receives by using multiple antennas to increase capacity and improve communication throughput, a channel state between each transmitter and each receiver should be known to receive a normal signal. Accordingly, a separate reference signal should be provided per transmitting antenna.

In the wireless communication system, the reference signal may be divided into two types in accordance with its purpose. Examples of the reference signal include a reference signal used for acquisition of channel information and a reference signal used for data demodulation. Since the former reference signal is intended for acquisition of channel information on the downlink through the user equipment, it needs to be transmitted through a wideband. Also, the former reference signal should be received even by a user equipment that does not receive downlink data for a specific subframe. Also, this reference signal for acquisition of channel information may be used even for measurement of handover. The latter reference signal is transmitted from the base station together with a corresponding resource when the base station transmits downlink data. In this case, the user equipment may perform channel estimation by receiving the corresponding reference signal, whereby the user equipment may demodulate the data. This reference signal for data demodulation should be transmitted to a region to which data are transmitted.

The 3GPP LTE system defines a common reference signal (CRS) shared by all the user equipments within a cell and a dedicated reference signal (DRS) for a specific user equipment only as downlink reference signals. The CRS is used for both acquisition of channel information and data demodulation, and may be referred to as a cell-specific reference signal. The base station transmits the CRS per subframe through a wideband. On the other hand, the DRS is used for data demodulation only, and may be transmitted through resource elements if data demodulation on the PDSCH is required. The user equipment may receive the presence of the DRS through upper layer signaling. The DRS is useful only if the corresponding PDSCH signal is mapped. The DRS may be referred to as a user equipment-specific reference signal (UE-specific RS) or demodulation reference signal (DMRS).

The receiver (user equipment) may estimate the channel status from the CRS, and may feed an indicator related to channel quality, such as a channel quality indicator (CQI), a precoding matrix index (PMI), and/or a rank indicator (RI), back to the transmitter (base station) in accordance with the estimated channel status. Alternatively, the reference signal related to feedback of the channel status information (CSI) such as CQI/PMI/RI may separately be referred to as CSI-RS. The CSI-RS for channel measurement is designed for channel measurement mainly unlike the existing CRS used for channel measurement and data demodulation. In this way, since the CSI-RS is transmitted only to obtain channel state information, the base station transmits the CSI-RS for all the antenna ports. Also, since the CSI-RS is transmitted to discover downlink channel information, the CSI-RS is transmitted to a full band unlike the DRS.

The current 3GPP LTE system defines two types transmission schemes, that is, an open-loop MIMO transmission scheme operated without channel information of the receiver and a closed-loop MIMO transmission scheme operated based on channel information. In the closed-loop MIMO transmission scheme, each of the transmitter and the receiver performs beamforming on the basis of channel information, that is, channel state information to obtain multiplexing gain of MIMO antenna. To acquire CSI from the user equipment, the base station commands the user equipment to feed downlink CSI back by allocating a physical uplink control channel (PUCCH) or a physical uplink shared channel (PUSCH) to the user equipment.

The CSI is classified into three types of information, that is, a rank indicator (RI), a precoding matrix index (PMI), and a channel quality indicator (CQI).

The RI represents rank information of a channel, and means the number of streams (or layers) that are received by the user equipment through the same frequency-time resource. Also, since RI is determined dominantly by long term fading of the channel, it is fed back from the user equipment to the base station at a time period longer than that of the PMI and the CQI.

The PMI is a value obtained by reflecting spatial properties of a channel, and represents a precoding index of the base station, which is preferred by the user equipment, on the basis of metric such as SINR (Signal to Interference plus Noise Ratio). In other words, the PMI is information on a precoding matrix used for transmission from the transmitter. The precoding matrix fed back from the receiver is determined considering the number of layers indicated by RI. The PMI may be fed back in case of closed-loop special multiplexing and large delay CDD transmission. In case of open-loop transmission, the transmitter may select the precoding matrix in accordance with a rule which is previously determined. A procedure of selecting PMI for each rank in the receiver is as follows. The receiver may calculate SINR, which is previously processed, for each PMI, convert the calculated SINR to sum capacity, and select the best PMI on the basis of the sum capacity. In other words, PMI calculation of the receiver may be regarded as a procedure of discovering the best PMI on the basis of the sum capacity. The transmitter that has received the PMI fed back from the receiver may use the precoding matrix recommended by the receiver as it is, and may include the precoding matrix recommended by the receiver in data transmission scheduling allocation information to the receiver as an indicator of 1 bit. Alternatively, the transmitter may not use the precoding matrix indicated by the PMI fed back from the receiver, as it is. In this case, the transmitter may explicitly include precoding matrix information used for data transmission to the receiver in scheduling allocation information.

The CQI is a value indicating strength of a channel, and means received SNR that may be obtained when the base station uses the PMI. The user equipment reports CQI index, which indicates specific combination in a set that includes combinations of predetermined modulation scheme and coding rates, to the base station.

Hereinafter, the downlink reference signal will be described in detail.

Figure 6:
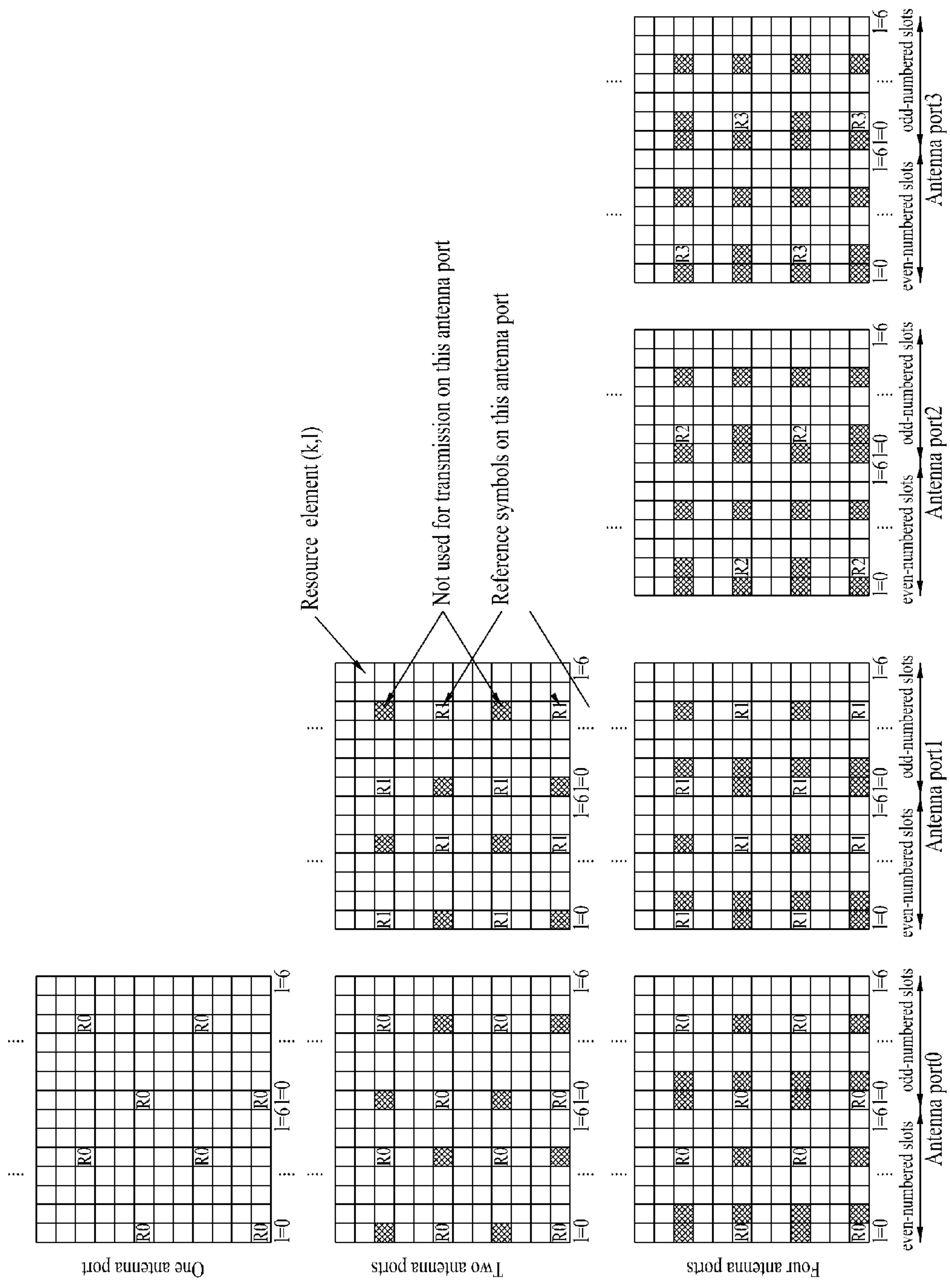
FIG. 6 is a diagram illustrating a pattern where a common reference signal (CRS) is arranged on a resource block if a normal cyclic prefix is used.

FIG. 6 is a diagram illustrating a pattern where a common reference signal (CRS) is arranged on a resource block if a normal cyclic prefix is used.

R0 to R3 shown in FIG. 6 represent resource elements to which CRS for antenna ports 0 to 3 is mapped. In other words, Rp represents a resource element into which reference signal transmission on an antenna port index p is mapped.

The CRS is defined in various formats depending on antenna configuration of the transmitter (base station). The 3GPP LTE system supports various antenna configurations, and a downlink signal transmitter (base station) has three types of antenna configurations of single antenna, two transmitting antennas and four transmitting antennas. If multiple antennas are supported, one of the antenna ports transmits a reference signal to a designated resource element (RE) location in accordance with a reference signal pattern, and does not transmit any signal to a resource element location designated for another antenna port.

A location on a frequency domain may be shifted so as not to generate collision of reference signals per cell, whereby channel estimation throughput through the CRS may be enhanced. For example, in view of one antenna, each reference signal may be located in the frequency domain at an interval of 6 subcarriers. Accordingly, at least five neighboring cells may locate the reference signals at different locations of the frequency domain through shifting of subcarrier unit in the frequency domain.

Also, as the downlink reference signal per cell may be multiplied by a sequence (for example, Pseduo-random (PN), m-sequence, etc.) which is previously defined, signal interference of pilot symbols received by the receiver from the neighboring cells may be reduced, whereby channel estimation throughput may be improved. PN sequence is applied in a unit of OFDM symbol within one subframe, and different PN sequences may be applied depending on cell ID, subframe number, OFDM symbol location, and ID of the user equipment.

Since the DM-RS is the reference signal for data demodulation, the DM-RS is located in a region which a downlink data channel is allocated, and is allocated to a location, to which the CRS is not allocated, in the region where the downlink data channel is allocated. The user equipment is signaled as to the presence of the DM-RS through an upper layer, that is, as to whether downlink data channel transmission is based on CRS or DM-RS.

Figure 7:
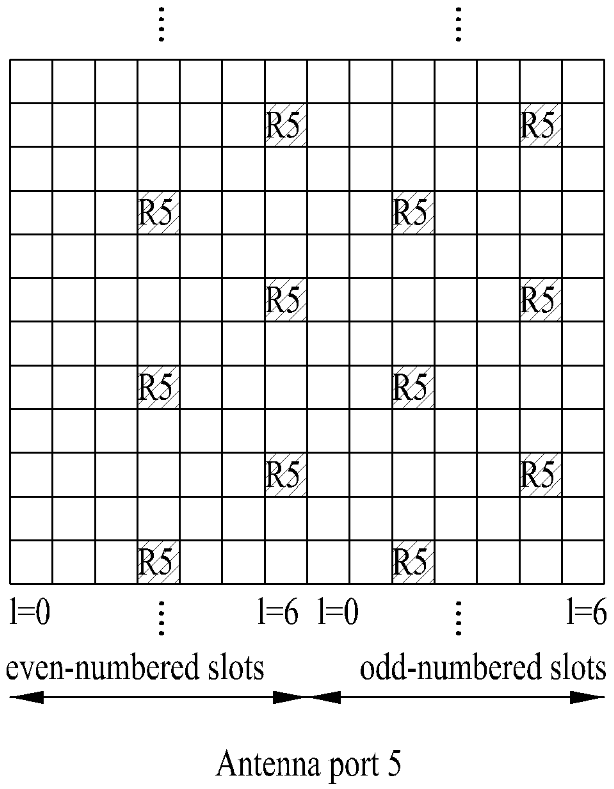
FIGS. 7 and 8 are diagrams illustrating patterns where a user equipment-specific reference signal (DM-RS) is arranged on a resource block if a normal cyclic prefix is used.
Figure 8:
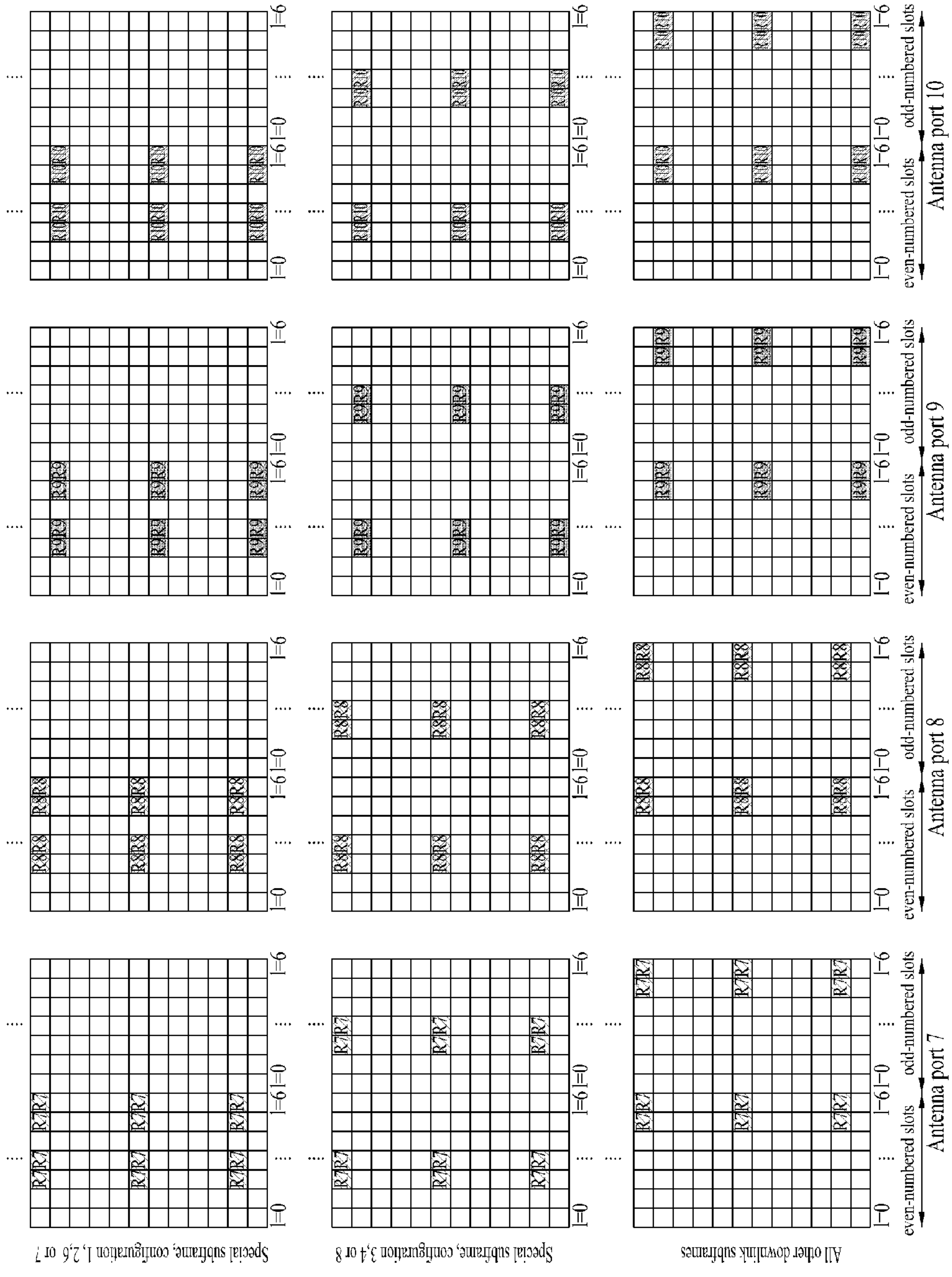

FIGS. 7 and 8 are diagrams illustrating patterns where a user equipment-specific reference signal (DM-RS) is arranged on a resource block if a normal cyclic prefix is used.

In the 3GGP LTE system, DM-RS for antenna ports p=5, p=7, p=8 or p=7, 8, . . . , ν+6 is defined. In this case, ν means the number of layers to which the PDSCH is transmitted. The DM RS for different antenna ports may be identified from one another by being located on different frequency resource (subcarriers) and/or different time resources (OFDM symbols). DM-RS set (S) may be divided into S={7, 8, 11, 13} and S={9, 10, 12, 14}, and may be transmitted to one user equipment through any one antenna port included in a specific antenna port set (S). The DM-RS for the antenna port {7, 8, 11, 13} included in the DM-RS set 1 may be mapped into the same resource element, and may be multiplexed by orthogonal code. If the number of layers transmitted to the user equipment is small (for example, the number of transmitted layers is 1 to 2), DRS pattern for antenna ports included in one set may be used. However, if a lot of layers are transmitted to the user equipment (for example, the number of transmitted layers is 3 to 8), DRS pattern for antenna ports included in two sets may be used.

FIG. 7 illustrates a pattern of DM-RS transmitted through antenna port 5, and FIG. 8 illustrates a pattern of DM-RS transmitted through antenna ports 7 to 10. R5, R7 to R10 shown in FIGS. 7 and 8 respectively represent resource elements to which DM-RS for antenna ports 5, 7 to 10 are mapped. In other words, Rp represents a resource element to which reference signal transmission on the antenna port p is mapped.

In the system (for example, LTE-A system that supports 8 Tx antennas) having antenna configuration more extended than that of the system (for example, LTE release 8 system that supports 4 Tx antennas) having the conventional antenna configuration, transmission of a new reference signal for acquiring channel state information (CSI) is required. Since the aforementioned CRS is the reference signal for antenna ports 0 to 3, it is required that a new reference signal for acquiring a channel state on the extended antenna ports should be designed additionally.

CSI-RS has been suggested for the purpose of channel measurement of the PDSCH separately from the CRS. Unlike the CRS, the CSI-RS may be defined by maximum 32 types of different configurations to reduce inter-cell interference (ICI) in a multi-cell environment.

Configuration for the CSI-RS is varied depending on the number of antenna ports of a cell, and CSI-RS defined by different configurations if possible are transmitted between neighboring cells. Also, CSI-RS configuration is identified by a type (normal cyclic prefix or extended cyclic prefix) of cyclic prefix, and may be divided into a case where the CSI-RS configuration is applied to both FS1 and FS2 in accordance with a frame structure (FS) type and a case where the CSI-RS configuration is applied to FS2 only. Also, unlike the CRS, the CSI-RS supports maximum 8 antenna ports (p=15, p=15,16, p=15, . . . , 18 or p=15, . . . , 22), and is defined for Δf=15 kHz only.

Figure 9:
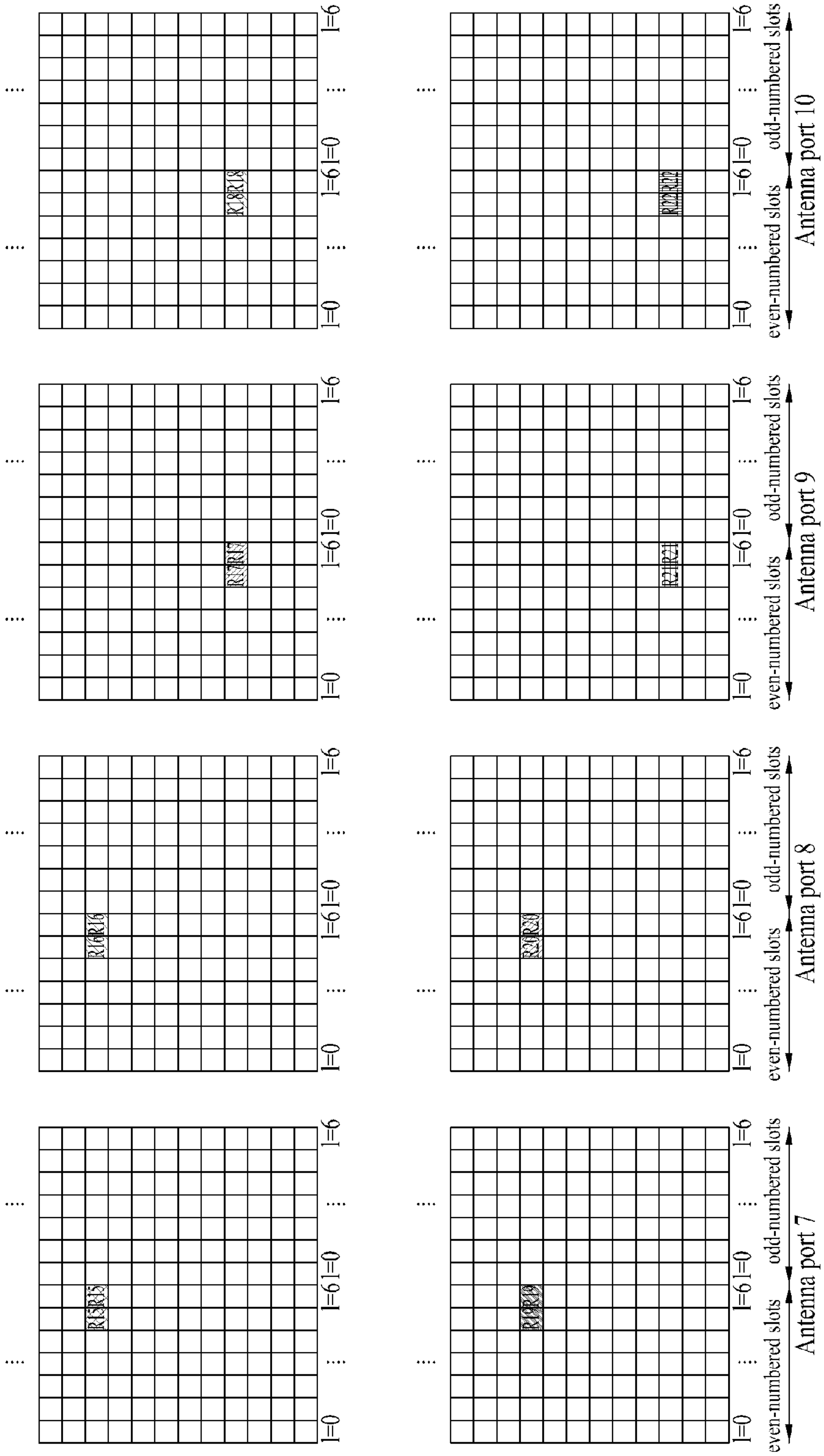
FIG. 9 is a diagram illustrating a pattern where CSI-RS based on CSI-RS configuration #0 is arranged on a resource block if a normal cyclic prefix is used.

FIG. 9 is a diagram illustrating a pattern where CSI-RS based on CSI-RS configuration #0 is arranged on a resource block if a normal cyclic prefix is used.

Referring to FIG. 9, a resource element to which the CSI-RS is transmitted is located on one resource block to which downlink data is transmitted. The CSI-RS for different antenna ports may be identified from one another by being located on different frequency resources (subcarriers) and/or different time resources (OFDM symbols). Also, the CSI-RS for different antenna ports located on the same time-frequency resource may be identified from one another by orthogonal code.

In the example of FIG. 8, CSI-RS for antenna ports 15 and 16, CSI-RS for antenna ports 17 and 18, CSI-RS for antenna ports 19 and 20, and CSI-RS for antenna ports 21 and 22 may be located on the same resource element, and may be multiplexed by orthogonal code.

Hereinafter, multiple CSI-RS configurations will be described.

Multiple CSI-RS configurations may be used within a single cell. In other words, one (or 0) configuration that assumes non-zero transmission power for CSI-RS in the user equipment and a plurality of configurations (or 0) that assume zero transmission power in the user equipment may be used.

For each bit set to 1 in 16 bit bitmap 'ZeroPowerCSI-RS' configured by an upper layer, the user equipment assumes zero transmission power in a resource element corresponding to 4 CSI-RS columns of Table 1 and Table 2 below. At this time, resource elements overlapped with the non-zero transmission power CSI-RS resource element configured by the upper layer are excluded. The highest bit of the bitmap corresponds to the lowest CSI-RS configuration index, and next bits sequentially correspond to CSI-RS configuration index.

The CSI-RS may exist on a downlink slot only that satisfies $n_s$ mod2 in Table 1 and Table 2 respectively based on normal cyclic prefix and extended cyclic prefix.

The user equipment assumes that the CSI-RS is not transmitted in case of the following cases:

special subframe in case of frame structure type 2;

subframe at which transmission of the CSI-RS collide with transmission of synchronization signal, physical broadcast channel (PBCH) or SystemInformationBlockType1 message; and subframe at which transmission of a paging message is configured.

The antenna port (S) may be identified by S={15}, S={15, 16}, S={17,18}, S={19,20} or S={21,22}. A resource element (k,l) used for CSI-RS transmission on a specific antenna port within one antenna port set is not used for PDSCH transmission through another antenna port within the same slot, and is not used for CSI-RS transmission for another antenna port within the corresponding antenna port set (S) within the same slot.

Table 1 illustrates a mapping relation of a resource element (k',l') based on CSI-RS configuration if normal cyclic prefix is used.

TABLE 1

| | CSI reference signal configuration | Number of CSI reference signals configured: 1 or 2 (k', l') | 1 or 2 $n_s$ mod 2 | 4 (k', l') | 4 $n_s$ mod 2 | 8 (k', l') | 8 $n_s$ mod 2 |
|---|---|---|---|---|---|---|---|
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

Table 2 illustrates a mapping relation of a resource element (k',l') based on CSI-RS configuration if extended cyclic prefix is used.

TABLE 2

| | CSI reference signal configuration | Number of CSI reference signals configured: 1 or 2 (k', l') | 1 or 2 $n_s$ mod 2 | 4 (k', l') | 4 $n_s$ mod 2 | 8 (k', l') | 8 $n_s$ mod 2 |
|---|---|---|---|---|---|---|---|
| Frame structure type 1 and 2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |

TABLE 2-continued

| | CSI reference signal configuration | Number of CSI reference signals configured: 1 or 2 (k', l') | 1 or 2: $n_s$ mod 2 | 4: (k', l') | 4: $n_s$ mod 2 | 8: (k', l') | 8: $n_s$ mod 2 |
|---|---|---|---|---|---|---|---|
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| Frame structure type 2 only | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

The CSI-RS may be transmitted at a specific subframe not every subframe. In more detail, the CSI-RS may be transmitted at a subframe, which satisfies the following Equation 1, with reference to CSI-RS subframe configuration as illustrated in Table 3 below.

TABLE 3

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$ - 5 |
| 15-34 | 20 | $I_{CSI-RS}$ - 15 |

TABLE 3-continued

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 35-74 | 40 | $I_{CSI-RS}$ - 35 |
| 75-154 | 80 | $I_{CSI-RS}$ - 75 |

In Table 3, $T_{CSI-RS}$ means a period for transmission of the CSI-RS, $\Delta_{CSI-RS}$ means an offset value, $n_f$ means a system frame number, and $n_s$ means a slot number. $I_{CSI-RS}$ may be set individually per CSI-RS.

$$(10n_f+\lfloor n_s/2\rfloor-\Delta_{CSI-RS})\bmod T_{CSI-RS}=0 \quad \text{[Equation 1]}$$

Also, the aforementioned CSI-RS may be signaled to the user equipment as CSI-RS config information element as illustrated in Table 4 below.

TABLE 4

```
-- ASN1START
CSI-RS-Config-r10 ::=     SEQUENCE {
    csi-RS-r10                 CHOICE {
        release                    NULL,
        setup                      SEQUENCE {
            antennaPortsCount-r10      ENUMERATED (an1, an2, an4, an8),
            resourceConfig-r10         INTEGER (0..31),
            subframeConfig-r10         INTEGER (0..154),
            p-C-r10                    INTEGER (-8..15)
        }
    }                                                    OPTIONAL,    -- Need ON
    zeroTxPowerCSI-RS-r10      CHOICE {
        release                    NULL,
        setup                      SEQUENCE {
            zeroTxPowerResourceConfigList-r10    BIT STRING (SIZE (16)),
            zeroTxPowerSubframeConfig-r10        INTEGER (0..154)
        }
    }                                                    OPTIONAL     -- Need ON
}
-- ASN1STOP
```

In Table 4, 'antennaPortsCount-r10' represents the number (selection of 1, 2, 4 and 8) of antennas through which the CSI-RS is transmitted, 'resourceConfig-r10' represents RE located within one RB on the time-resource frequency, and 'subframeConfig-r10' represents a subframe at which CSI-RS EPRE value for PDSCH EPRE is transmitted. Additionally, the base station transfers information on zero power CSI-RS.

In CSI-RS configuration, 'resourceConfig-r10' represents a location to which the CSI-RS is transmitted. This indicates exact symbol and subcarrier location within one resource block in accordance with CSI-RS configuration number (see Table 1 or Table 2) expressed as numbers of 0 to 31.

Table 5 illustrates description of a CSI-RS configuration field.

| CSI-RS-Config field descriptions |
|---|
| antennaPortsCount |
| Parameter indicating the number of antenna ports used for CSI-RS transmission. Antenna 1 corresponds to 1, antenna 2 corresponds to 2, and the others correspond likewise. |
| p-C |
| $P_c$ parameter |
| resourceConfig |
| parameter indicating CSI-RS configuration |
| subframeConfig |
| $I_{CSI-RS}$ parameter |
| zeroTxPowerResourceConfigList |
| ZeroPowerCSI-RS parameter |
| zeroTxPowerSubframeConfig |
| $I_{CSI-RS}$ parameter |

Hierarchical Beamforming

Massive MIMO (Multi-Input Multi-Output) system may maximize beam gain by using a lot of antennas and remove effect of intra-cell interference and noise. In this massive MIMO system, a transmission scheme may be varied depending on a duplex system such as TDD (Time Division Duplex) and FDD (Frequency Division Duplex).

The TDD system means that a downlink and an uplink use the same frequency band and are identified from each other by time. Accordingly, if a coherence time of a radio channel is long, that is, if Doppler effect is small, it may be assumed that radio channel features of the downlink and the uplink are the same as each other. This may be referred to as reciprocity. Accordingly, the base station may perform channel estimation by using reference signals (RS) of the user equipments, which are transmitted to the uplink, and may transmit a downlink signal by using channel information estimated during downlink transmission. In other words, since the base station does not need to transmit a separate downlink reference signal to acquire downlink channel information, gain may be obtained in view of resource overhead, and acts as great gain in the massive MIMO system that uses a lot of antennas. Also, in view of beamforming which is a main purpose of the massive MIMO system, the transmitter (for example, base station) may calculate a beamforming vector by using a channel or signal transmitted from the receiver (for example, user equipment) on the basis of reciprocity in the TDD system as described above. The beamforming vector means that weight values applied to each antenna are configured as a vector. For example, if the beamforming vector is $w=[w_1\ w_2 \ldots w_N]^T$, the transmitted signal s may be multiplied by $w_k$ and then transmitted at the kth antenna. However, in case of the TDD system, a gap for a transition time between the downlink and the uplink on the frame structure, that is, a gap for a transition guard time should be considered by considering round trip delay. In other words, if cell coverage is greater, the transition guard time is increased, which may act as throughput deterioration. For this reason, the TDD system is accompanied with restrictions in cell coverage as compared with the FDD system. Also, the TDD system should consider the same downlink/uplink (DL/UL) configuration between neighboring base stations to control interference between the neighboring base stations, and accompanies restrictions that uplink/downlink transmission synchronization between the base stations should be performed. The duplex system of the massive MIMO may be considered even in the FDD system due to such a problem of the TDD system.

The FDD system is the system that the downlink uses frequency different from that of the uplink. Accordingly, the base station cannot use channel information estimated using the reference signals (RS) of the user equipment, which are transmitted to the uplink during downlink transmission, unlike the TDD system. In other words, since features of channel reciprocity cannot be used in the FDD system, another solution should be considered. Accordingly, in case of the FDD system, the base station should transmit a reference signal to acquire channel information on the downlink and receive channel information fed back from the user equipment unlike the TDD system. In other words, the base station provides a reference signal or pilot, which may estimate a channel of each antenna of the transmitter (for example, base station), and the receiver (for example, user equipment) reports channel state information to the base station on the basis of the channel estimated using the reference signal. Hereinafter, the conventional beamforming operation will be described with reference to FIG. 10.

Figure 10:
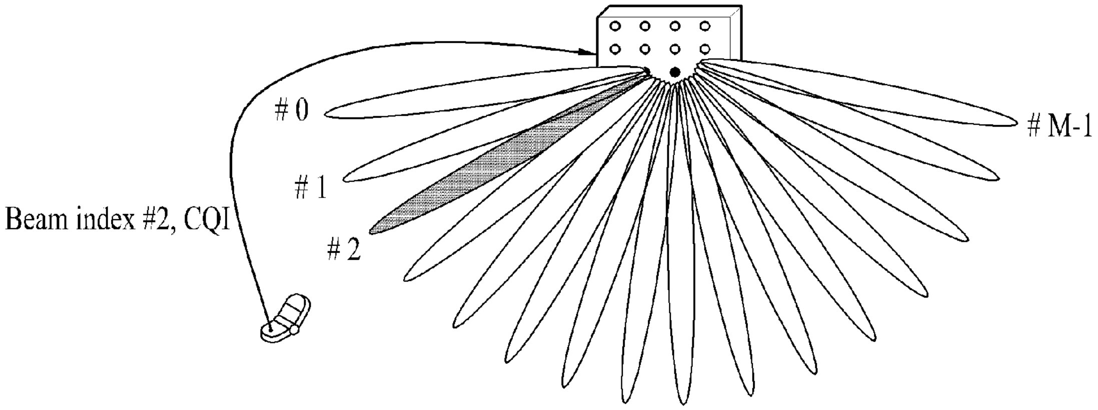
FIG. 10 is a diagram illustrating a conventional beamforming operation.

FIG. 10 is a diagram illustrating the conventional beamforming operation.

Referring to FIG. 10, if the conventional beamforming (CBF) is used, the base station transmits a total of M reference signals to provide the user equipment with M number of beam patterns. In the example of FIG. 10, M=16. The user equipment reports beam of #2 from M number of reference signals to the base station, and the base station transmits a downlink signal to the corresponding user equipment by performing precoding corresponding to #2 during downlink transmission.

In the IEEE 802.16m or LTE/LTE-A system, the user equipment (that is, receiver) selects a proper beamforming vector (or precoding matrix/vector) from a codebook corresponding to the number of antennas of the base station (that is, transmitter) and reports index of the selected result to the base station. In this codebook based beamforming (or precoding), the amount of information transmitted from the user equipment to the base station depends on a size of the codebook. Generally, since suboptimal performance as compared with optimized performance may be obtained in the 2, 4 or 8 Tx system even though a codebook size of 6 bits or less is used, the 2, 4, or 8 Tx system may be used preferably in a commercial system. Also, as a method for acquiring beamforming gain in the FDD system, in addition to codebook based beamforming, a channel matrix or corresponding covariance matrix may be quantized and then notified to the base station, or an analog value which is not quantized may be transmitted to the base station.

However, since a lot of antennas are considered in the massive MIMO system, feedback overhead to be transmitted by the user equipment as well as reference signal overhead should be considered. If the FDD system assumes that the number of antennas of the base station is 100 and all the antennas are respectively used for beamforming, the number of resource elements (RE) to be used by the base station to transmit the reference signal is 100 or more. At this time, the resource element means a resource that may be used in a code domain as well as time and frequency domains. For example, in the LTE system, 8 (in case of single antenna) resource elements, 16 (in case of 2 antennas) resource elements, and 24 (in case of 4 antennas) resource elements are used to transmit the CRS within one resource block (RB), and 8 (in case of 8 antennas) resource elements are used to transmit the CSI-RS. The problem occurring as the number of antennas is increased may act as overhead in feedback information of the user equipment and codebook design as well as reference signal overhead. For example, codebook design should be performed in accordance with the number of antennas transmitted from the base station. This may cause restrictions in the number of transmitting antennas from the base station or a lot of codebook types. Also, in order to use codebook based closed loop MIMO, the number of dimensions to be expressed by the codebook corresponding to the number of corresponding antennas is increased as the number of antennas is increased, whereby the codebook size is increased proportionally. Accordingly, the user equipment should perform many operations to calculate suitable PMI within the codebook, and the amount of information to be fed back is increased in accordance with increase of the codebook types and codebook size.

The aforementioned conventional procedure of acquiring channel information on the downlink is not suitable in the massive MIMO system that considers a lot of antennas. Accordingly, a method for using the massive MIMO system in the FDD system, that is, a method for maintaining system overhead and complexity for supporting Tx beamforming gain within a reasonable range while sufficiently acquiring Tx beamforming gain if a massive antenna is installed in the transmitter in the FDD system will be suggested.

In the present invention, random beamforming may be considered to reduce reference signal overhead or feedback overhead. Random beamforming means a scheme that a plurality of beam patterns are transmitted randomly in the form of open loop or using limited information only without channel information received from the user equipment when beamforming is performed, whereby signal-to-noise ratio (SNR) of the user equipment may be increased. Various open loop beamforming techniques or various techniques for adaptation of random features of beam to information received from the user equipment may be included in random beamforming Hereinafter, the technique suggested in the present invention is based on that beam pattern is hierarchically designed when random beamforming is performed and the user equipment feeds beam index back. This may be referred to as hierarchical beamforming (HBF) or hierarchical beam selection (HBS). If the suggested technique is applied to the massive MIMO system, the reference signal per antenna is not required to be transmitted, and the user equipment has only to feed its preferred beam index only back without feeding channel information on each antenna back, whereby reference signal overhand and feedback overhead may be reduced.

Figure 11:
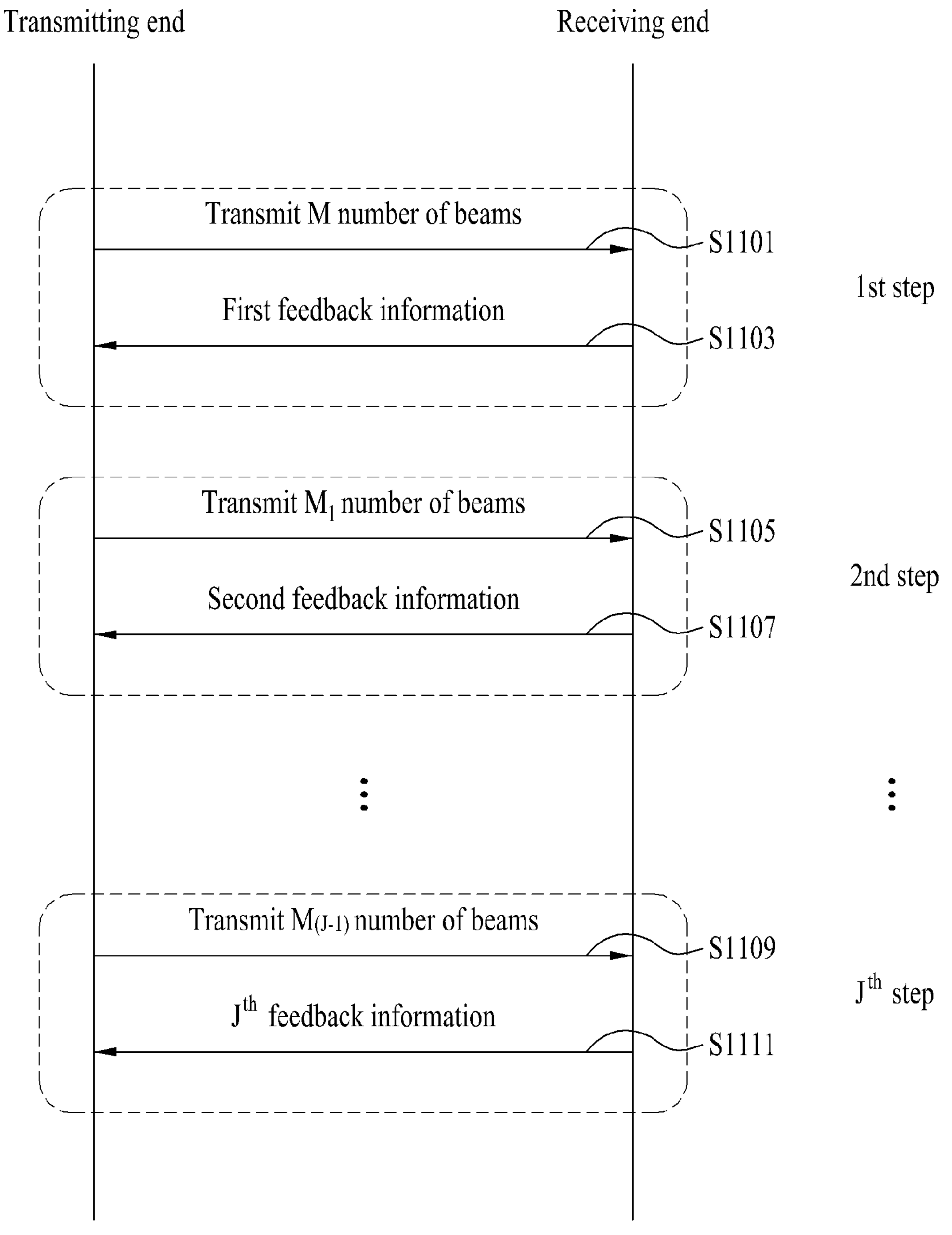
FIG. 11 is a diagram illustrating a hierarchical beamforming method according to one embodiment of the present invention.

FIG. 11 is a diagram illustrating a hierarchical beamforming method according to one embodiment of the present invention.

Referring to FIG. 11, the transmitter transmits M number of beams to the receiver by performing random beamforming (S1101). At this time, the transmitter may transmit a beam pattern to the receiver by using M (M<=the number of antennas of the transmitter) number of reference signals. In other words, the M number of beams may respectively correspond to the reference signals. Also, the beam may be mapped into each antenna port and then transmitted in the form of the reference signal.

The receiver measures M number of beams transmitted from the transmitter, selects at least one or more N number of beams and then transmits information on the selected beam to the transmitter (S1103). In this case, the information on the beam may include at least one of index (or reference signal index, antenna port index) of the selected beam, signal strength of the selected beam, channel state information (for example, CSI, CQI, PMI, RI, RSRP, etc.) of the selected beam, and signal quality when PMI is used. The steps S1101 and S1103 may be referred to as the first step or the initial step of the hierarchical beamforming method according to the present invention. The information fed back from the user equipment at the first step or the initial step may be referred to as first feedback information.

Subsequently, the transmitter transmits $M_1$ number of beams to the receiver by considering information on N number of beams received from the receiver at the first step (S1105). In this case, $M_1$ number of beams (for example, beam angle, etc.) may be determined by N number of beams selected by the receiver at the previous step (that is, first step). The receiver selects at least one or more $N_1$ number of beams by measuring $M_1$ number of beams transmitted from the transmitter and then transmits information on the selected beam to the transmitter (S1107). Likewise, the information on the beam may include at least one of index (or reference signal index, antenna port index) of the selected beam, signal strength of the selected beam, and channel state information (for example, CSI, CQI, PMI, etc.) of the selected beam. The steps S1105 and S1107 may be referred to as the second step of the hierarchical beamforming method according to the present invention. Alternatively, the respective steps S1105 to S1111 after the aforementioned initial step may be referred to as a repetition step, and the information fed back from the user equipment at the repetition step may be referred to as second feedback information.

Afterwards, as each step is repeated, the transmitter transmits $M_{(j-1)}$ number of beams to the receiver by considering information on the beam received at a previous J−1th step (s1109), and the receiver selects at least one or more $N_{(j-1)}$ number of beams by measuring $M_{(j-1)}$ number of beams transmitted from the transmitter, and then transmits information on the selected beam to the transmitter (S1111). At this time, since hierarchical depth or step size that means the number of repetition times of each step is previously determined, the base station and the user equipment may mutually know the hierarchical depth or step size, and the base station may notify the user equipment of the hierarchical depth or step size through upper layer signaling.

The respective steps for the aforementioned hierarchical beamforming operation may be configured to be performed periodically. Also, the beam provided by the transmitter per step may be designed independently, and behavior of the receiver at each step may be performed independently.

Figure 12:
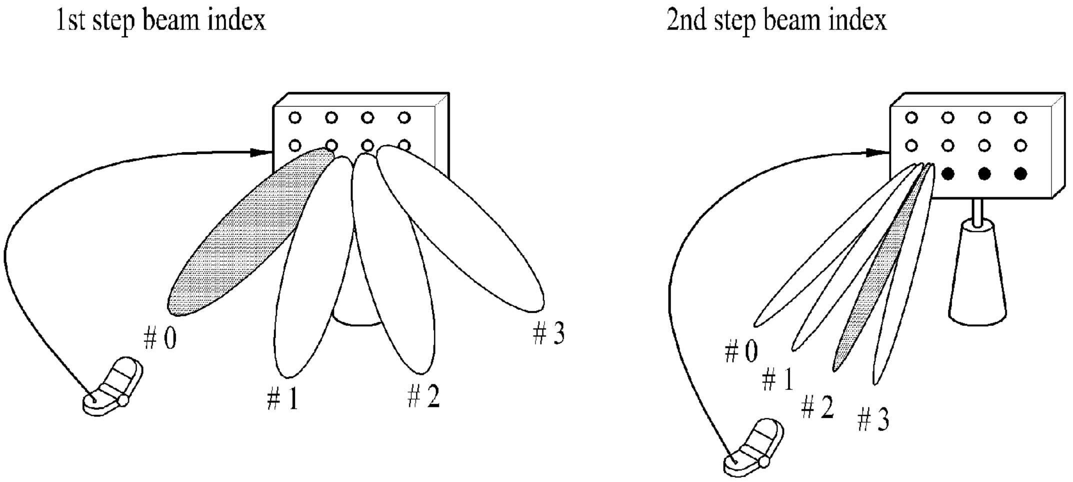
FIGS. 12 to 14 are diagrams briefly illustrating a hierarchical beamforming operation according to one embodiment of the present invention.

FIG. 12 is a diagram briefly illustrating a hierarchical beamforming operation according to one embodiment of the present invention.

FIG. 12 illustrates that the transmitter transmits beams to the receiver through two steps and the receiver selects beam at each step and notifies the transmitter of information on the selection beam. At the first step, the transmitter transmits M number of beams (M=4 in FIG. 12), and the receiver may transmit information (for example, beam index, signal strength, channel state information (CQI), etc.) on one of M number of beams to the transmitter. At the second step, the transmitter configures $M_1$ ($M=M_1$ or $M\neq M_1$) number of beams on the basis of the information on the beam transmitted from the receiver and provides the receiver with the configured beams. The receiver retransmits information on one of the configured beams to the transmitter. In FIG. 12, the receiver selects one beam in the same manner as the conventional beamforming scheme and reports information on the selected beam to the transmitter. However, the receiver may select a plurality of beams and report information on the selected beams to the transmitter, or may report different kinds of information per step to the transmitter. This will be described with reference to FIG. 13.

Figure 13:
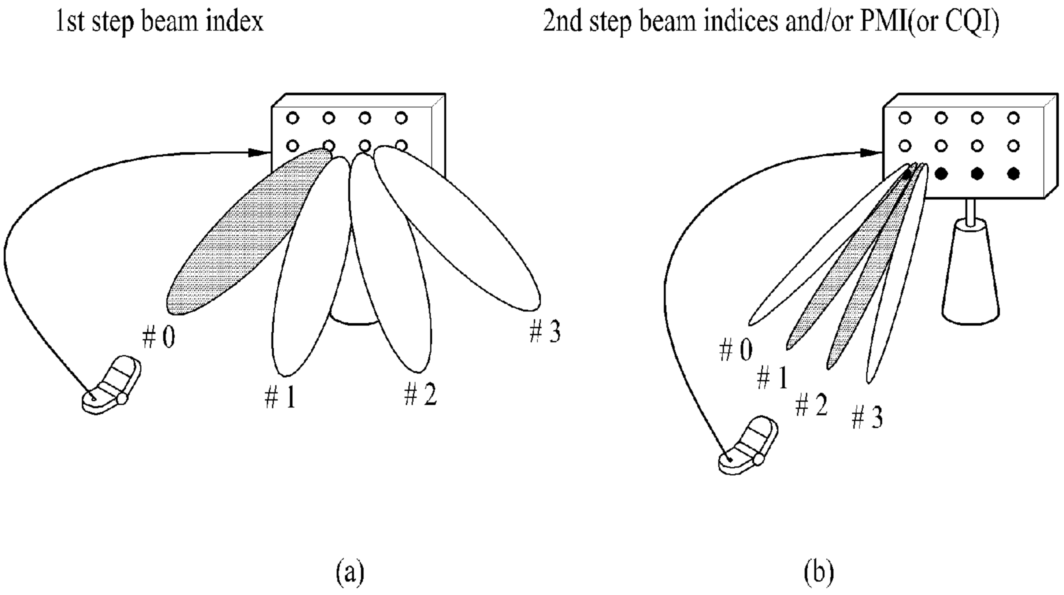

FIG. 13 is a diagram briefly illustrating a hierarchical beamforming operation according to another embodiment of the present invention.

Referring to FIG. 13, at the first step, the transmitter provides M number of beams (M=4 in FIG. 13), and the receiver transmits at least one of information (for example, beam index, signal strength, channel state information (CQI), etc.) on $N_1$ number of beams of M number of beams to the transmitter. At the second step, the transmitter provides $M_1$ ($M=M_1$ or $M\neq M_1$) number of beams on the basis of the information on the beam transmitted from the receiver. The receiver transmits information (for example, beam index and/or PMI) on $N_2$ number of beams of $M_1$ number of beams to the transmitter. PMI may be selected from $N_2$ Tx codebook. At this time, it is preferable that a value of $N_2$ is 2 and the receiver selects $N_2$ number of beams having the greatest signal strength. However, although PMI is transmitted as the information on the beam at the second step in FIG. 13, PMI may be included in the information on $N_1$ number of beams transmitted from the receiver at the first step. In this case, PMI may be selected from $N_1$ Tx codebook. Also, a preferable value of $N_1$ may be 2, and it is preferable that the receiver selects $N_1$ number of beams having the greatest signal strength.

In an environment where line of sight (LOS) is dominant, it is likely that $N_1$ number of beams (first step) or $N_2$ number of beams (second step) selected by the receiver have continuous indexes. In this case, when the receiver reports the indexes on $N_1$ number of beams (first step) or $N_2$ number of beams (second step) to the transmitter, the receiver may transmit only the index (for example, the lowest index or the highest index of $N_1$ number of beams or $N_2$ number of beams) to the transmitter.

In this way, as the hierarchical beamforming scheme is used, reference signal overhead may be minimized as compared with the aforementioned Conventional BeamForming (CBF). Although a total of 16 reference signals should be used to provide 16 beams in the example (M=16) of FIG. 10, a total of 8 reference signals are used to provide the same beam quality as that of FIG. 10 in the example of FIG. 12 or FIG. 13 in such a manner that 4 reference signals are used to provide 4 beams at the first step and 4 beams are transmitted within a beam preferred by the user equipment at the second step (it is assumed that the same beams as those of the first step are used). In other words, the suggested technique may reduce overhead by using the reference signals equivalent to M (the number of beams in CBF)/J (step size in HBF) while providing the same beam quality as that of the CBF.

Also, the hierarchical beamforming scheme may provide beam quality higher than that of a case where the same reference signal overhead as that of the CBF occurs. This will be described with reference to FIG. 14.

Figure 14:
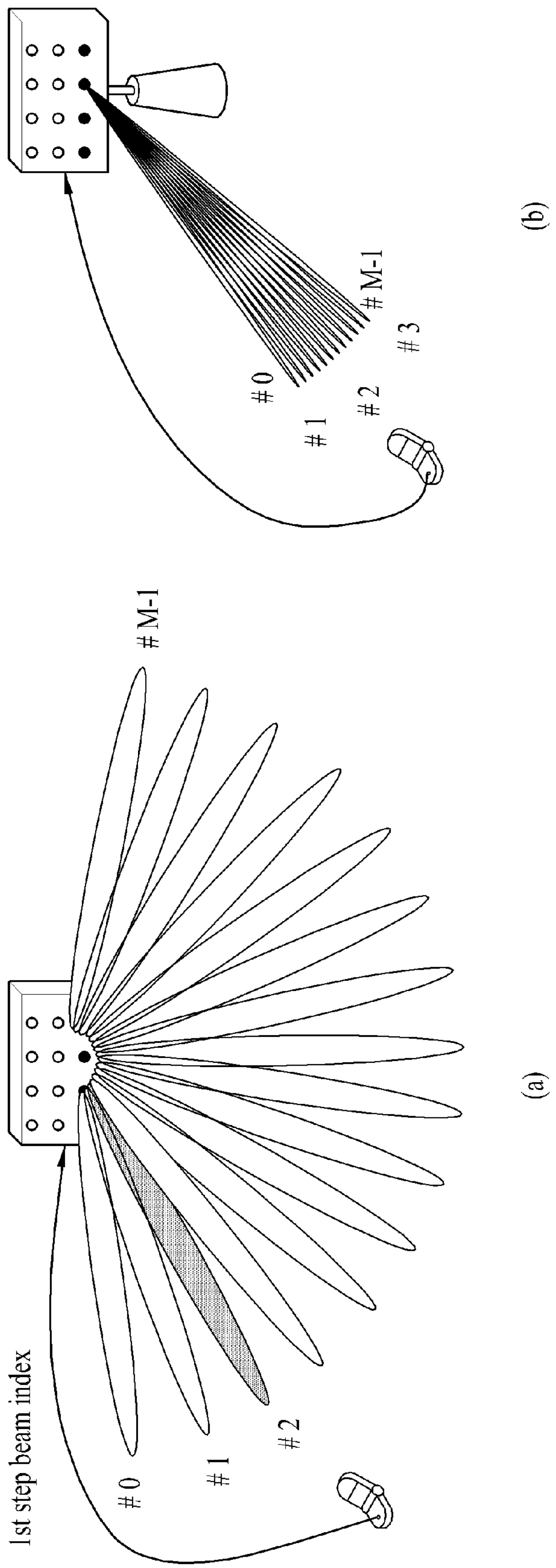

FIG. 14 is other diagram briefly illustrating a hierarchical beamforming operation according to one embodiment of the present invention.

Referring to FIG. 14, at the first step, 16 beam patterns are transmitted using 16 (M=16) reference signals, and 16 beam patterns for the beam preferred by the user equipment are transmitted at the second step, whereby more adaptive beamforming than the conventional beamforming may be performed.

The hierarchical beamforming scheme according to the present invention may be applied to both the downlink and the uplink. Hereinafter, for convenience of description, the downlink and the uplink will be described respectively.

Downlink

The hierarchical beamforming scheme according to the present invention will be described in more detail per step. Hereinafter, it is assumed that the number of antennas of the base station is N and hierarchical dept or step size is J.

1) First Step

The base station may transmit m (m<=N) number of beam patterns cell-specifically by using m number of reference signals. For example, the conventional LTE/LTE-A system, since different reference signals are transmitted per antenna port, if the base station uses 100 antennas, 100 reference signals should be generated. However, according to the present invention, different reference signals per beam pattern may be transmitted. In other words, even though the base station uses 100 antennas, reference signals equivalent to the number of beam patterns less than 100 may be transmitted. Finally, each beam pattern may be referred to as a precoded reference signal (for example, CSI-RS). For example, if the present invention is applied to the LTE system, the base station may transmit beam patterns to the user equipment by using m number of CSI-RS precoded to have directionality which is equally spread.

At this time, to generate m number of beam patterns, a steering vector expressed by the following Equation 2 may be used for each reference signal.

[Equation 2]

$$a_1 = \frac{1}{\sqrt{\beta}}\left[1 \ e^{-jkdsin\theta_1^1} \ \ldots \ e^{-jk(N-1)dsin\theta_1^1}\right]$$

$$a_2 = \frac{1}{\sqrt{\beta}}\left[1 \ e^{-jkdsin\theta_2^1} \ \ldots \ e^{-jk(N-1)dsin\theta_2^1}\right]$$

$$\vdots$$

$$a_m = \frac{1}{\sqrt{\beta}}\left[1 \ e^{-jkdsin\theta_m^l} \ \ldots \ e^{-jk(N-1)dsin\theta_m^l}\right]$$

Referring to Equation 2, k is $2\pi/\lambda$, $\lambda$ means a wavelength of transmitting frequency, and d means a distance between antennas. $\theta_m^j$ means an angle for the mth beam pattern at the jth step. $\beta$ is a constant value for normalizing overall power of a signal transmitted to an antenna and means the square of sum (Euclidean norm value) of absolute values of elements of the steering vector.

At this time, a beam width is determined due to the number of antennas used to generate a beam pattern. In other words, if a lot of antennas are used, a beam pattern having a narrower width may be generated. Accordingly, to provide a wider beam width, steering vectors as expressed by the following Equations 3 to 5 may be used. Since the first step is that the base station searches for directionality towards the user equipment by transmitting a beam pattern to the user equipment equally for all the directions, the base station may search for directionality towards all the user equipments, which belong to cell coverage, by using the beam pattern having a wider width.

[Equation 3]

$$a_1 = \frac{1}{\sqrt{\beta}}\left[1 \quad 0 \quad e^{-jkd\sin\theta_1^1} \quad 0 \quad \ldots \quad e^{-jk(N-2)d\sin\theta_1^1} \quad 0\right]$$

$$a_2 = \frac{1}{\sqrt{\beta}}\left[1 \quad 0 \quad e^{-jkd\sin\theta_2^1} \quad 0 \quad \ldots \quad e^{-jk(N-2)d\sin\theta_2^1} \quad 0\right]$$

$$\vdots$$

$$a_m = \frac{1}{\sqrt{\beta}}\left[1 \quad 0 \quad e^{-jkd\sin\theta_m^l} \quad 0 \quad \ldots \quad e^{-jk(N-2)d\sin\theta_m^l} \quad 0\right]$$

Referring to the Equation 3, a value of 0 is applied to even numbered antennas of the steering vector, whereby the corresponding antennas do not transmit a signal. Since the beam patterns are generated using only half (N/2) of a total of antennas, a wider beam width may be provided. For example, as compared with the Equation 2, although an angle of each beam pattern which is generated may be the same as that generated by the Equation 2, the beam patterns are generated using less antennas, whereby each beam width may become wider. Also, although the beam patterns are generated using half (N/2) of a total of antennas in the Equation 3, the beam patterns may be generated using the number of antennas (for example, ¼, ⅛, etc of a total of antennas) different from the half of a total of antennas. In this case, an interval of antennas used for generation of the beam patterns may be maintained uniformly to provide the same beam width per angle of each beam pattern. For example, if the antennas corresponding to ¼ of a total of antennas are used, the antennas having 4 intervals may be used to generate the beam patterns.

Alternatively, a given number of antennas may be grouped to configure the steering vector as expressed by the following Equation 4.

[Equation 4]

$$a_1 = \frac{1}{\sqrt{\beta}}\left[1 \quad 1 \quad e^{-jkd\sin\theta_1^1} \quad e^{-jkd\sin\theta_1^1} \quad \ldots \quad e^{-jk(N-2)d\sin\theta_1^1} \quad e^{-jk(N-2)d\sin\theta_1^1}\right]$$

$$a_2 = \frac{1}{\sqrt{\beta}}\left[1 \quad 1 \quad e^{-jkd\sin\theta_2^1} \quad e^{-jkd\sin\theta_2^1} \quad \ldots \quad e^{-jk(N-2)d\sin\theta_2^1} \quad e^{-jk(N-2)d\sin\theta_2^1}\right]$$

$$\vdots$$

$$a_m = \frac{1}{\sqrt{\beta}}\left[1 \quad 1 \quad e^{-jkd\sin\theta_m^l} \quad e^{-jkd\sin\theta_m^l} \quad \ldots \quad e^{-jk(N-2)d\sin\theta_m^l} \quad e^{-jk(N-2)d\sin\theta_m^l}\right]$$

Referring to the Equation 4, as the same value is applied to the antennas which belong to the same group, the same signal is transmitted to each group, whereby a beam width wider than that of a case where different values equivalent to a total of antennas are applied to the corresponding antennas may be provided. For example, as compared with the Equation 2, although an angle of each beam pattern which is generated may be the same as that generated by the Equation 2, the beam patterns are generated using less antennas, whereby each beam width may become wider. Although two antennas belong to one group in the Equation 4, the number of antennas constituting one group may be varied (for example, 3 antennas, 4 antennas, etc.).

Alternatively, a certain number of beam patterns may be grouped, whereby the grouped beam patterns may be transmitted as one reference signal. The steering vector corresponding to a case where two beam patterns are grouped may be expressed by the following Equation 5.

[Equation 5]

$$a_1 = \frac{1}{\sqrt{\beta}}\left[2 \quad e^{-jkd\sin\theta_1^1} + e^{-jkd\sin\theta_2^1} \quad \ldots \quad e^{-jk(N-1)d\sin\theta_1^1} + e^{-jk(N-1)d\sin\theta_2^1}\right]$$

$$a_2 = \frac{1}{\sqrt{\beta}}\left[2 \quad e^{-jkd\sin\theta_3^1} + e^{-jkd\sin\theta_4^1} \quad \ldots \quad e^{-jk(N-1)d\sin\theta_3^1} + e^{-jk(N-1)d\sin\theta_4^1}\right]$$

$$\vdots$$

$$a_{m/2} = \frac{1}{\sqrt{\beta}}\left[2 \quad e^{-jkd\sin\theta_{m-1}^l} + e^{-jkd\sin\theta_m^l} \quad \ldots \quad e^{-jk(N-1)d\sin\theta_{m-1}^l} + e^{-jk(N-1)d\sin\theta_m^l}\right]$$

Referring to the Equation 5, since two beam patterns having their respective angles different from each other are grouped to generate a wider beam pattern, a wider beam width may be provided. For example, since a beam pattern having an angle of 30 degrees and a beam pattern having an angle of 60 degrees are grouped to generate one beam pattern, the grouped beam pattern may have a beam pattern type having an angle between 30 degrees and 60 degrees. For example, as compared with the Equation 2, the number of reference signals which are generated may be half of the reference signals generated in the Equation 2, and each beam pattern generated by the Equation 5 may have a beam width corresponding to two beam widths generated by the Equation 2.

The user equipment that has received the beam patterns from the base station feeds index of its preferred beam among the beam patterns transmitted from the base station back to the base station. At this time, the index of the beam reported by the user equipment may be more than 1. As described above, in order to obtain the index of the beam preferred by the user equipment, the user equipment may use received power of the reference signals each of which has a beam pattern. This may be implemented even with less complexity.

Also, the user equipment may report signal strength of the reference signal corresponding to each index or channel quality information (for example, CSI, CQI, PMI, etc.) to the base station together with the indexes of the beams. At this time, if the user equipment reports signal strength or channel quality information of each beam to the base station while reporting the plurality of beam indexes, although signal strength or channel quality information, which is reported for each beam, may be reported as an absolute value, it may be reported as a relative value (for example, relative difference value or relative ratio) between the plurality of beams which are reported. For example, a relative ratio of received power between the plurality of beams which are reported is previously determined as a table as illustrated in Table 1 below, and the user equipment may reduce the amount of information which is fed back, by reporting a bitmap indicating the relative ratio of the received power in the table to the base station.

Table 6 illustrates a relative ratio between the beams which are reported to the base station and a bitmap based on the relative ratio.

TABLE 6

| Ratio | Reporting bitmap |
|---|---|
| 1:1 | 00 |
| 1:0.7 | 01 |
| 1:0.5 | 10 |
| 1:0.3 | 11 |

Referring to Table 6, the user equipment reports two beam indexes to the base station, and Table 6 illustrates relative ratios of received power between two beams and bitmaps corresponding to the relative ratios. Although Table 6 illustrates the relative values between two beams and the bitmaps based on the relative values, relative values among beams more than 2 or more bits may be determined as a table. Also, if a relative value between two beams is more subdivided (for example, 8 ratios), more bits may be used.

Also, as described above, when the user equipment feeds its preferred beam index back to the base station, the user equipment may report PMI to the base station together with the beam index. At this time, PMI means index which is previously determined and indicates a precoding matrix existing within a codebook (for example, see Table 2) known by the base station and the user equipment. Hereinafter, it is assumed that the user equipment selects two beam indexes and feeds the selected beam indexes back to the base station.

The user equipment may calculate an optimized precoding matrix by using the following Equation 6 and report PMI on the calculated precoding matrix to the base station.

$$\{W, H\} = \underset{\substack{\tilde{W}\in C \\ \tilde{H}\in T}}{\operatorname{argmax}} \|\tilde{H}\tilde{W}\|_F^2 \qquad \text{[Equation 6]}$$

Table 7 illustrates a codebook when the number of reference signals is 2.

TABLE 7

| Codebook index | Number of layers υ: 1 | Number of layers υ: 2 |
|---|---|---|
| 0 | $\frac{1}{\sqrt{2}}\begin{bmatrix}1\\1\end{bmatrix}$ | $\frac{1}{\sqrt{2}}\begin{bmatrix}1&0\\0&1\end{bmatrix}$ |
| 1 | $\frac{1}{\sqrt{2}}\begin{bmatrix}1\\-1\end{bmatrix}$ | $\frac{1}{2}\begin{bmatrix}1&1\\1&-1\end{bmatrix}$ |
| 2 | $\frac{1}{\sqrt{2}}\begin{bmatrix}1\\j\end{bmatrix}$ | $\frac{1}{2}\begin{bmatrix}1&1\\j&-j\end{bmatrix}$ |
| 3 | $\frac{1}{\sqrt{2}}\begin{bmatrix}1\\-j\end{bmatrix}$ | — |

Referring to the Equation 6 and Table 7, $\tilde{W}$ means one of precoding matrixes existing in a codebook $C=\{W_0, W_1, W_2, W_3\}$, and $\tilde{H}$ means a channel matrix (T=Channel response of $\{a_{i-1}, a_i\}$) for two random beam patterns $\{a_{i-1}, a_i\}$ of beam patterns $A=\{a_1, a_2, \ldots, a_m\}$ transmitted to the user equipment.

In this case, the user equipment may perform full search for its preferred beam index and PMI by using the Equation 6 and then report the beam index and PMI to the base station. In other words, the channel matrix $\tilde{H}$ for two random beam patterns of the full beam patterns transmitted to the user equipment and a random precoding vector $\tilde{W}$ of the precoding vectors included in the codebook illustrated in Table 7 may be applied to the Equation 6, whereby the optimized beam index and precoding matrix (that is, PMI), which have the greatest channel size, may be obtained.

Alternatively, the user equipment may obtain PMI only based on its preferred beam index by using the Equation 6 (hereinafter, referred to as partial search). In other words, the channel matrix $\tilde{H}$ for two beam patterns (for example, two beam patterns having the greatest received power) selected by the user equipment and a random precoding vector $\tilde{W}$ of the precoding vectors included in the codebook illustrated in Table 7 may be applied to the Equation 6, whereby the optimized precoding matrix (that is, PMI) having the greatest channel size may only be obtained.

In this way, if the user equipment reports PMI to the base station together with its preferred beam index, the base station applies the precoding matrix based on the PMI received from the user equipment to the beam pattern which is transmitted at next step. In other words, the base station multiples the steering vector applied at next step by the precoding matrix reported by the user equipment to generate the beam pattern of next step and then transmits the generated beam pattern to the user equipment.

2) Second Step

The base station that has received the beam index from the user equipment generates second m' number of beam patterns UE-specifically by using the beam index fed back from the user equipment. At this time, the number of the beam patterns generated at the second step may be the same as that of the beam patterns generated at the first step (m=m'), or may be different from that of the beam patterns generated at the first step (m≠m' or m/2≠m' of Equation 5).

Also, m' number of beam angles generated at the second step may be obtained using the beam index reported by the user equipment at the first step. In other words, m' number beam patterns having specific directionality are generated considering directionality of the beam index reported by the user equipment at the first step. For example, if the angle preferred by the user equipment is $\theta_2^{\,1}$, the m' number of beam angles generated at the second step have values of $\theta_1^{\,1} < \theta_{1,\ldots,m'}^{\,2} < \theta_3^{\,1}$. At this time, the steering vector expressed by the following Equation 7 may be used for each reference signal to generate the m' number of beam patterns.

$$\begin{aligned} a_1 &= \frac{1}{\sqrt{N}}\left[1\ e^{-jkd\sin\theta_1^2}\ \ldots\ e^{-jk(N-1)d\sin\theta_1^2}\right] \\ a_2 &= \frac{1}{\sqrt{N}}\left[1\ e^{-jkd\sin\theta_2^2}\ \ldots\ e^{-jk(N-1)d\sin\theta_2^2}\right] \\ &\vdots \\ a_{m'} &= \frac{1}{\sqrt{N}}\left[1\ e^{-jkd\sin\theta_{m'}^2}\ \ldots\ e^{-jk(N-1)d\sin\theta_{m'}^2}\right] \end{aligned} \qquad \text{[Equation 7]}$$

Referring to the Equation 7, k is 2π/λ, λ means a wavelength of a transmitting frequency, and d means a distance between antennas. $\theta_m^{\,j}$ means an angle for the mth beam pattern at the jth step. β is a constant value for normalizing overall power of a signal transmitted to an antenna and means the square of sum (Euclidean norm value) of absolute values of elements of the steering vector.

Also, various steering vectors described at the first step may be used as the steering vector at the second step. In other words, the steering vector expressed by the Equations 3 to 5 may be reused. For example, if the Equation 3 is used, the beam patterns may be generated using the antennas spaced apart from one another at a certain interval among the full antennas. If the Equation 4 is used, a certain number of antennas may be grouped to generate the beam patterns. If the Equation 5 is used, a certain number of beam patterns may be grouped to generate one beam pattern.

If the beam indexes fed back from the user equipment are two or more and absolute information or relative information on signal strength of each beam is reported to the base station, the angle value for generating the beam pattern of the second step in the base station may be determined adaptively by un-equal quantization.

Figure 15:
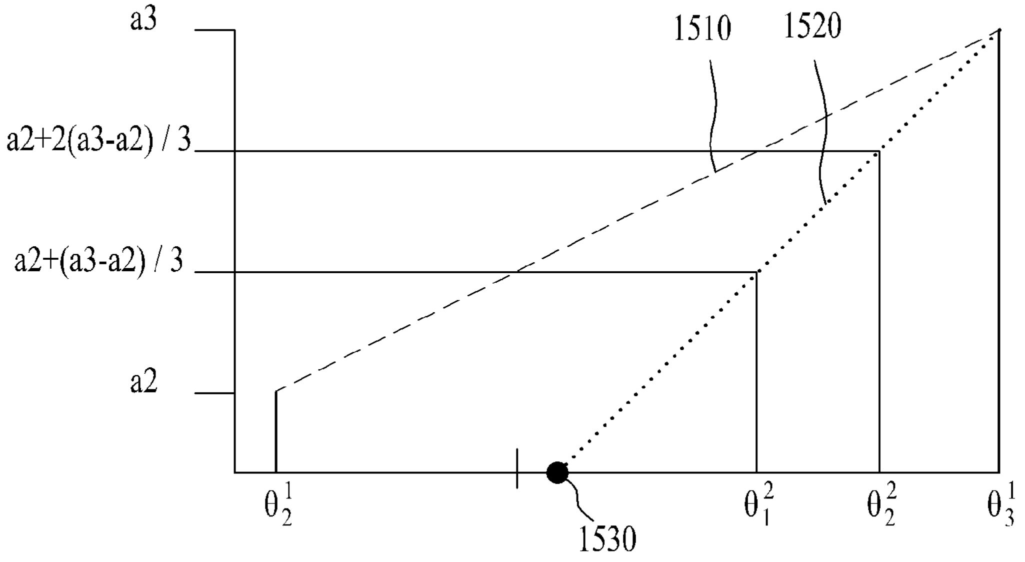
FIG. 15 is a diagram illustrating a beam angle adaptation method based on un-equal quantization according to the present invention.

FIG. 15 is a diagram illustrating a beam angle adaptation method based on un-equal quantization according to the present invention.

In FIG. 15, it is assumed that the beam indexes reported by the user equipment at the first step are a2 and a3, a beam angle of a2 is $\theta_2^1$, and a beam angle of a3 is $\theta_3^1$.

If the user equipment reports the beam indexes a2, a3 only to the base station, the base station may determine an angle value for generating the beam patterns of the second step at an equal interval by using equal/linear quantization 1510. In other words, an angle of the beam having index of a2+(a3−a2)/3 may be determined as $\theta_2^1+(\theta_3^1-\theta_2^1)/3$, and an angle of the beam having index of a2+2(a3−a2)/3 may be determined as $\theta_2^1+2(\theta_3^1-\theta_2^1)/3$.

On the other hand, if the user equipment reports strength of each beam together with the beam indexes a2, a3 to the base station (it is assumed that 'a2 beam strength<a3 beam strength'), the base station may determine an angle value for generating the beam patterns of the second step at an unequal interval by using unequal/nonlinear quantization 1520. In other words, if beam strength of the first step becomes close to the angle (a3 in FIG. 15) of a relatively great beam, a beam angle interval $\theta_1^2-\theta_2^1$ may be dense.

If beam strength of the first step becomes close to the angle (a2 in FIG. 15) of a relatively small beam, a beam angle interval $\theta_3^1-\theta_2^2$ may be wide. In this case, for application of the unequal quantization 1520, an angle of a slope of the unequal quantization 1520 may be determined as a relative value (for example, relative difference value, relative ratio, etc.) on the basis of an angle of a slope of the equal quantization 1510. In this case, a relative value of the angle of the slope of the unequal quantization 1520 and the slope of the equal quantization 1510 may be determined using a ratio (for example, see Table 6) of relative strength of the beams a2 and a3 reported by the user equipment at the first step. Also, the slope of the unequal quantization 1520 may be determined on the assumption that the value of the beam angle $\theta_2^1$ of a2 is a specific value 1530. In this case, the specific value 1530 may be determined as a relative value (for example, relative difference value, relative ratio, etc.) on the basis of the value of the beam angle $\theta_2^1$ of a2, and the relative value of the specific value 1530 and the beam angle $\theta_2^1$ of a2 may be determined using a ratio (for example, see Table 6) of relative strength of the beams a2 and a3 reported by the user equipment at the first step.

Also, in a non line of sight (Non-LOS) environment, the beam indexes preferred by the user equipment may not be continuous unlike the aforementioned example. In this case, the base station may configure each beam pattern per beam index reported by the user equipment, wherein the full beam patterns of the second step may be divided per beam index reported by the user equipment. For example, if the beam indexes reported by the user equipment are $\theta_2^1$, $\theta_5^1$, the base station may individually configure the beam patterns such as $$\theta_1^1<\theta^2_{1,\ldots\frac{m'}{2}-1}<\theta_3^1,\ \theta_4^1<\theta^2_{\frac{m'}{2},\ldots m'}<\theta_6^1.$$

In the same manner as the first step, the user equipment that has received the beam patterns from the base station feeds index of its preferred beam among the beam patterns transmitted from the base station back to the base station. At this time, the user equipment may report signal strength of the reference signal corresponding to each index or channel quality information (for example, CSI, CQI, PMI, etc.) to the base station together with the index of the beam. Also, a type of information on the beam reported by the user equipment at the second step may be different from a type of information on the beam reported to the base station by the user equipment at the first step.

3) Jth Step

The operations of the base station and the user equipment at each of the aforementioned steps may be repeated in the same manner. In other words, at the Jth step, the base station configures beam patterns by using feedback information reported from the user equipment at the J−1th step.

In the meantime, the base station may indicate a feedback operation of the user equipment at each step by transmitting configuration information (hereinafter, referred to as 'feedback configuration information') on the feedback operation of the user equipment. This indication information may include at least one of the number of antenna ports which are selected (or the number of beams), selection reference of antenna ports (or beams), application or not of PMI (precoding/preferred matrix index), individual signal strength of selected antenna port (or beam), individual signal quality (for example, CQI or CSI-RS based RSRP) of selected antenna port (or beam), signal quality when PMI is applied, and RI (Rank Indication/Index). At this time, the base station may notify the user equipment of feedback configuration information (feedback operations of the user equipment for the respective steps may be the same as one another or different from one another) on all the steps prior to the first step (for example, prior to the step S1101 in the example of FIG. 11) of the hierarchical beamforming scheme, or may notify the user equipment of feedback configuration information per step prior to (for example, prior the steps S1101, S1105 and S1109 in the example of FIG. 11) each step. Alternatively, the base station may notify the user equipment of configuration information prior to the first step and prior to each step.

If the present invention is applied to the LTE-A system, an example of allowing the base station to configure information to be fed back from the user equipment will be described. The base station may transmit at least one type of CSI-RS configuration information to the user equipment and indicate a type of feedback information to be fed back from the user equipment in accordance with each CSI-RS configuration. In other words, the base station may command the user equipment to feed back corresponding antenna port index (or beam index) and corresponding signal strength by selecting $N_1$ number of antenna ports (or beams) in accordance with first CSI-RS configuration and to feed back corresponding antenna port index (or beam index), PMI and CQI by selecting $N_2$ number of antenna ports (or beams) in accordance with second CSI-RS configuration. In this case, the user equipment may select PMI from N2 Tx codebook.

Rank means the number of data streams (or layers) transmitted and received to and from the same resource at the same time. If a plurality of beams or antenna ports are selected in the suggested method, at least one stream to streams equivalent to the number of selected beams or antenna ports may be transmitted and received at the same time using the corresponding beams or antenna ports. The base station may fix the rank such that the user equipment may configure feedback information by assuming the given rank. For example, if the rank is fixed to 1, even though the user equipment selects a plurality of beams or antenna ports, the user equipment may assume that the selected beams or antenna ports form one data stream. Alternatively, the base station may command the user equipment to determine the rank and perform feedback. For example, in a state that the user equipment selects two beams (or antenna ports) and feeds index of the selected beams (or antenna ports) back and selects PMI from 2 Tx codebook and feeds the selected PMI back, although feedback information corresponding to rank 1 and rank 2 includes indexes of the two beams (or antenna ports) and PMI, beam (or antenna port) index and the amount of PMI related feedback information may be reduced as follows considering features in the aforementioned LOS dominant environment. In other words, in case of rank 1, feedback information such as (the highest index or the lowest index of the selected beams (or antenna ports)+PMI) may be configured. In case of rank 2, feedback information such as (index of beam (or antenna port) selected at the first step+index of beam (or antenna port) selected at the second step) may be configured.

Alternatively, the number of selected antenna ports (or beams) which are indicated by the base station may be replaced with a maximum number (=M) of antenna ports (or beams) that may be selected by the user equipment. In this case, the codebook includes M×1 vectors, each of which may have 1 (or 2) to M number of non-zero elements. For example, if the base station commands the user equipment to select maximum three antenna ports (or beams) and apply PMI, the codebook may be configured as expressed by the following Equation 8 or 9, and PMI may be selected from such a codebook.

[Equation 8]

$$\left\{\begin{bmatrix}1\\0\\0\end{bmatrix}, \alpha_1\begin{bmatrix}1\\1\\0\end{bmatrix}, \alpha_2\begin{bmatrix}1\\-1\\0\end{bmatrix}, \alpha_3\begin{bmatrix}1\\j\\0\end{bmatrix}, \alpha_4\begin{bmatrix}1\\-j\\0\end{bmatrix}, \alpha_5\begin{bmatrix}1\\1\\1\end{bmatrix}, \alpha_6\begin{bmatrix}1\\-1\\1\end{bmatrix}, \alpha_7\begin{bmatrix}1\\1\\-1\end{bmatrix}, \alpha_8\begin{bmatrix}1\\-1\\-1\end{bmatrix}\right\}$$

[Equation 9]

$$\left\{\alpha_1\begin{bmatrix}1\\1\\0\end{bmatrix}, \alpha_2\begin{bmatrix}1\\-1\\0\end{bmatrix}, \alpha_3\begin{bmatrix}1\\j\\0\end{bmatrix}, \alpha_4\begin{bmatrix}1\\-j\\0\end{bmatrix}, \alpha_5\begin{bmatrix}1\\1\\1\end{bmatrix}, \alpha_6\begin{bmatrix}1\\-1\\1\end{bmatrix}, \alpha_7\begin{bmatrix}1\\1\\-1\end{bmatrix}, \alpha_8\begin{bmatrix}1\\-1\\-1\end{bmatrix}\right\}$$

Also, if the present invention is applied to the LTE-A system, an example of allowing the base station to configure a selection reference of antenna ports (or beams) of the user equipment will be described. The base station may notify the user equipment of 8 Tx CSI-RS configuration and command the user equipment to select 1, 2 or 3 antenna ports (or beams) of 8 CSI-RS antenna ports (or beams) and feed the selected antenna ports (or beams) back. As a reference used when the user equipment selects antenna ports (or beams), antenna ports (or beams) of which signal quality exceeds a first threshold value may be selected, or antenna ports (or beams) of which relative size as compared with maximum signal quality exceeds a first threshold value may be selected. When feeding the selected antenna ports (or beams) back, the user equipment may feed the result of the selected antenna ports (or beams), which are sequentially sorted in accordance with signal quality, back. At this time, if the base station commands the user equipment to apply PMI, the user equipment may select a precoding vector from the codebook, which includes precoding vectors of 2 Tx and 3 Tx, and may feed index of the selected precoding vector back. The codebook includes vectors of dimension corresponding to the number of antenna ports (or beams) that may be selected by the user equipment. In other words, if the base station commands the user equipment to select 1, 2, or 3 antenna ports (or beams) as described above, the user equipment selects one vector from the codebook, which includes 2×1 vectors and 3×1 vectors, and feeds the corresponding index back to the base station. If the number of 2×1 vectors is $N_2$ and the number of 3×1 vectors is $N_3$, the index includes ceil(log 2($N_2$+$N_3$)) bits. In this case, Ceil(x) means the smallest natural number of numbers greater than x. Alternatively, indexes of ceil(log 2(1+$N_2$+$N_3$)) bits may be fed back. In this case, one value (for example, 0) in the indexes represents that one antenna port (or beam) has been selected. The codebook may be configured as expressed by the following Equation 8 or 9. In the Equations 10 and 11, $\alpha_k$ is a constant.

[Equation 10]

$$\left\{1, \alpha_1\begin{bmatrix}1\\1\end{bmatrix}, \alpha_2\begin{bmatrix}1\\-1\end{bmatrix}, \alpha_3\begin{bmatrix}1\\j\end{bmatrix}, \alpha_4\begin{bmatrix}1\\-j\end{bmatrix}, \alpha_5\begin{bmatrix}1\\1\\1\end{bmatrix}, \alpha_6\begin{bmatrix}1\\-1\\1\end{bmatrix}, \alpha_7\begin{bmatrix}1\\1\\-1\end{bmatrix}, \alpha_8\begin{bmatrix}1\\-1\\-1\end{bmatrix}\right\}$$

[Equation 11]

$$\left\{\alpha_1\begin{bmatrix}1\\1\end{bmatrix}, \alpha_2\begin{bmatrix}1\\-1\end{bmatrix}, \alpha_3\begin{bmatrix}1\\j\end{bmatrix}, \alpha_4\begin{bmatrix}1\\-j\end{bmatrix}, \alpha_5\begin{bmatrix}1\\1\\1\end{bmatrix}, \alpha_6\begin{bmatrix}1\\-1\\1\end{bmatrix}, \alpha_7\begin{bmatrix}1\\1\\-1\end{bmatrix}, \alpha_8\begin{bmatrix}1\\-1\\-1\end{bmatrix}\right\}$$

Uplink

Considering a normal user equipment (user equipment having a small number of antennas) in an uplink, the base station may perform maximum ratio combining (MRC) by using the reference signal transmitted from the user equipment. Accordingly, unlike the downlink, the uplink in the FDD system may be managed without considering reference signal overhead or feedback overhead. However, in case of an environment, such as vehicle, train or building, that the user equipment may have a lot of antennas, complexity is increased due to overhead of the reference signal transmitted from the user equipment and as the base station should perform channel estimation for each antenna of the user equipment. Accordingly, in this case, the suggested hierarchical beamforming scheme may be applied to the uplink.

In order to perform hierarchical beamforming in the uplink, the hierarchical beamforming scheme should be managed UE-specifically from the first step in accordance with location of each user equipment, channel status or mobility. At this time, assuming Omni-antenna, it does not have a concept of a cell sector unlike the downlink, the user equipment may configure the beam of the first step cell-specifically to cover 360 degrees not 120 degrees.

Parameters which will be transferred from the base station to the user equipment to manage the uplink hierarchical beamforming scheme are as follows.

1) Step size

2) The number of beam patterns

3) Value at the first step (value after the second step)

4) Preferred beam index and/or PMI

Referring to FIG. 11 again, in case of the uplink hierarchical beamforming, the transmitter may correspond to the user equipment, and the receiver may correspond to the base station. The parameters for the uplink hierarchical beamforming scheme may respectively be notified from the base station (that is, receiver) to the user equipment (that is, transmitter) prior to the first step (for example, prior to the step S1101 in the example of FIG. 11) and prior to each step (for example, prior to the steps S1101, S1105 and S1109 in the example of FIG. 11).

The base station may use a semi-static control channel (for example, RRC signaling) or a dynamic control channel (for example, PDCCH) to indicate the parameters to the user equipment. Alternatively, the base station may transfer these parameters to the user equipment together with RRC signaling and PDCCH. In other words, since step size and the number of beam patterns are associated with hardware performance of the user equipment, the step size and the number of beam patterns may be indicated through RRC signaling, and an angle value $\theta$ that may be varied instantaneously, beam index and PMI may be indicated through the PDCCH. At this time, a downlink control information (DCI) format of the PDCCH may be configured as a new DCI format different from the conventional format and then transferred through a UE-search space (USS), or may be transmitted in such a manner that the parameters may be added to the conventional DCI format. Since the user equipment knows that indication information is transmitted, if the indication information is transmitted through the USS, the user equipment may acquire the parameters without increasing the number of blind decoding times for acquiring a DCI format.

If the present invention is applied to the LTE-A system, an example of allowing the user equipment to perform a hierarchical beamforming operation by using a sounding reference signal (SRS) will be described. In order to perform the hierarchical beamforming operation in the uplink, the user equipment may first notify the base station that the user equipment has a capability of managing hierarchical beamforming. Subsequently, the base station may designate two types of SRS configurations for the user equipment. The SRS transmitted from the user equipment on the basis of the first SRS configuration and the second SRS configuration is generated by applying different weight values to M number of antennas. For example, antenna weight values which are used when 4 SRS antenna ports (or beams) are transmitted in accordance with the first SRS configuration and when 4 SRS antenna ports (or beams) are transmitted in accordance with the second SRS configuration may respectively be $\Omega=\{w_1, w_2, w_3, w_4\}$ and $\Theta=\{v_1, v_2, v_3, v_4\}$. In this case, $\Omega\neq\Theta$, and $w_k$ and $v_k$ respectively mean weight vectors of M×1 size used for the kth SRS antenna port (or beam) transmitted in accordance with the first and second SRS configurations. In other words, the base station that has received the SRS transmitted from the user equipment in accordance with the first SRS configuration transfers the measurement result of SRS to the user equipment, and the user equipment transmits the SRS by determining the weight value of the SRS antenna port (or beam) based on the second SRS configuration on the basis of the measurement result of SRS. Preferably, the user equipment may know a set $\Omega$ of weight vectors which will be used for SRS for transmission in accordance with the first SRS configuration and a set $\Theta_1, \ldots, \Theta_L$ of weight vectors which will be used for SRS for transmission in accordance with the second SRS configuration. If the base station measures the SRS transmitted from the user equipment in accordance with the first SRS configuration and notifies the user equipment that SRS antenna port (or beam) having the best signal quality is #p (antenna port (or beam) which is absolute or relative), the user equipment uses weight vectors of $\Theta_{\#p}$ for SRS which will be transmitted in accordance with the second SRS configuration. It is preferable that the base station dynamically notifies the user equipment of the measured result of the SRS based on the first SRS configuration, through DCI. The corresponding DCI may include one or more SRS antenna port (or beam) indexes. Alternatively, the corresponding DCI may include a bitmap of a size equivalent to the number of antenna ports (or beams) of the first SRS configuration. The user equipment determines a weight vector of the SRS which will be transmitted by the second SRS configuration on the basis of the SRS antenna port (or beam) expressed as '1' in the SRS antenna port (or beam) indexes.

The base station may notify the user equipment of an antenna port (or beam) which will be used for the uplink and/or a precoding vector which will be applied between the antenna ports (or beams) by measuring the SRS transmitted in accordance with the second SRS configuration. For example, after measuring four SRS antenna ports (or beams) transmitted from the user equipment in accordance with the second SRS configuration, the base station may include any one precoding vector index belonging to a codebook expressed by the following Equation 12 in the DCI format (for example, DCI format 0 or 4) used for PUSCH scheduling.

$$\left\{\begin{matrix}\begin{bmatrix}1\\0\\0\\0\end{bmatrix}\begin{bmatrix}0\\1\\0\\0\end{bmatrix}\begin{bmatrix}0\\0\\1\\0\end{bmatrix}\begin{bmatrix}0\\0\\0\\1\end{bmatrix}\begin{bmatrix}1\\1\\0\\0\end{bmatrix}\begin{bmatrix}1\\-1\\0\\0\end{bmatrix}\begin{bmatrix}1\\j\\0\\0\end{bmatrix}\begin{bmatrix}1\\-j\\0\\0\end{bmatrix}\begin{bmatrix}1\\0\\1\\0\end{bmatrix}\\ \begin{bmatrix}0\\1\\1\\0\end{bmatrix}\begin{bmatrix}0\\1\\-1\\0\end{bmatrix}\begin{bmatrix}0\\1\\j\\0\end{bmatrix}\begin{bmatrix}0\\1\\-j\\0\end{bmatrix}\begin{bmatrix}0\\1\\0\\1\end{bmatrix}\begin{bmatrix}0\\1\\0\\-1\end{bmatrix}\begin{bmatrix}0\\1\\0\\j\end{bmatrix}\begin{bmatrix}0\\1\\0\\-j\end{bmatrix}\begin{bmatrix}0\\0\\1\\1\end{bmatrix}\\ \begin{bmatrix}1\\0\\-1\\0\end{bmatrix}\begin{bmatrix}1\\0\\j\\0\end{bmatrix}\begin{bmatrix}1\\0\\-j\\0\end{bmatrix}\begin{bmatrix}1\\0\\0\\1\end{bmatrix}\begin{bmatrix}1\\0\\0\\-1\end{bmatrix}\begin{bmatrix}1\\0\\0\\j\end{bmatrix}\begin{bmatrix}1\\0\\0\\-j\end{bmatrix}\\ \begin{bmatrix}0\\0\\1\\-1\end{bmatrix}\begin{bmatrix}0\\0\\1\\j\end{bmatrix}\begin{bmatrix}0\\0\\1\\-j\end{bmatrix}\begin{bmatrix}1\\1\\1\\1\end{bmatrix}\begin{bmatrix}1\\-1\\1\\1\end{bmatrix}\begin{bmatrix}1\\1\\-1\\1\end{bmatrix}\begin{bmatrix}1\\1\\1\\-1\end{bmatrix}\end{matrix}\right\} \quad \text{[Equation 12]}$$

This codebook should be known by the base station and the user equipment. If any one precoding vector index belonging to the codebook is included in the DCI format, additional information on the antenna port (or beam) index may not be included in the DCI format. The example of the above codebook includes precoding vectors of which the number of non-zero elements is 1, 2 and 4. Each of the vectors belonging to the codebook may be multiplied by a specific constant value.

Hereinafter, the simulation result obtained by comparison between conventional beamforming (CBF) and hierarchical beamforming (HBF) will be described. Hereinafter, switched beamforming in the simulation result means the conventional beamforming. In other words, as described above, the step for beamforming includes one step only, and if the base station generates a total of M number of beam patterns, the user equipment reports only one beam pattern to the base station, and the base station generates a beam pattern having an angle corresponding to a beam pattern index reported by the user equipment. In case of HBF, it is assumed that two steps for beamforming are configured, and 16 beam patterns are generated using 64 antennas. Hereinafter, in the simulation result, a vertical axis represents capacity, and means bits that may be transmitted per time/Hz. A horizontal axis represents a signal-to-noise ratio (SNR).

Figure 16:
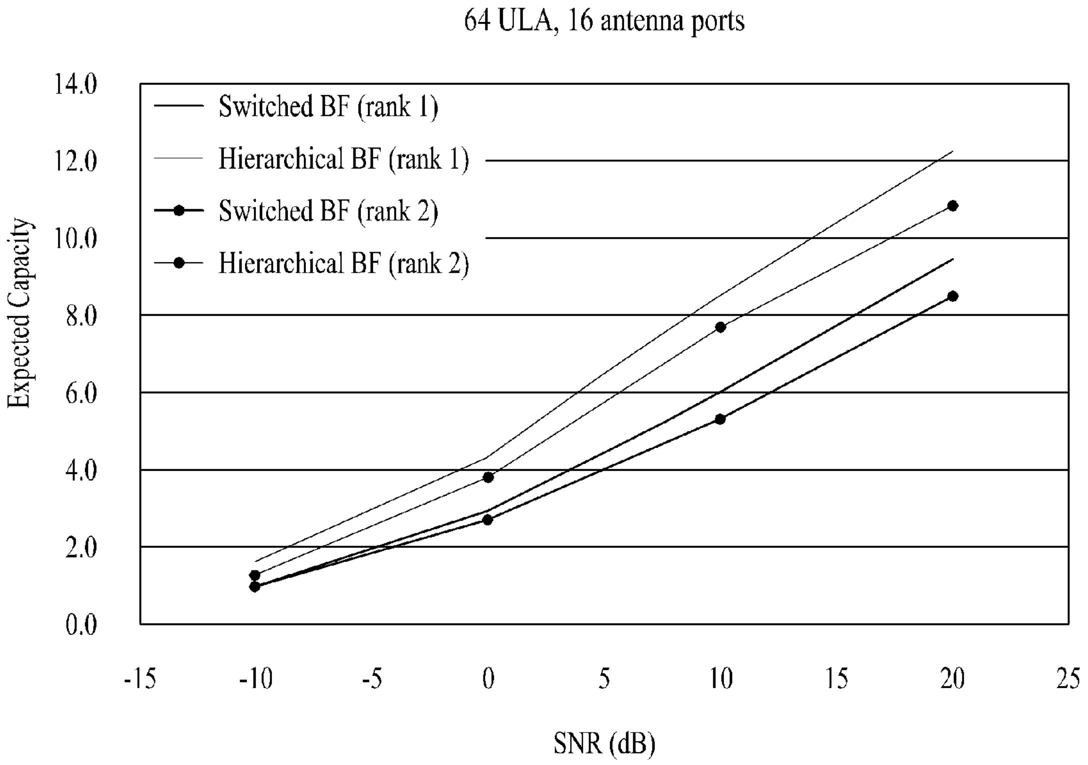
FIGS. 16 to 18 are graphs illustrating a simulation result based on a hierarchical beamforming scheme according to the present invention.

FIG. 16 is a graph illustrating a simulation result based on a hierarchical beamforming scheme according to the present invention.

Referring to FIG. 16, the HBF provides throughput gain of about 2 dB to 8 dB on the assumption of the same expected capacity as compared with the CBF in accordance with the simulation result in a LOS environment. Alternatively, the HBF provides gain of about 0.5~2 bit/s/Hz in the same SNR environment (−5~20 dB).

Figure 17:
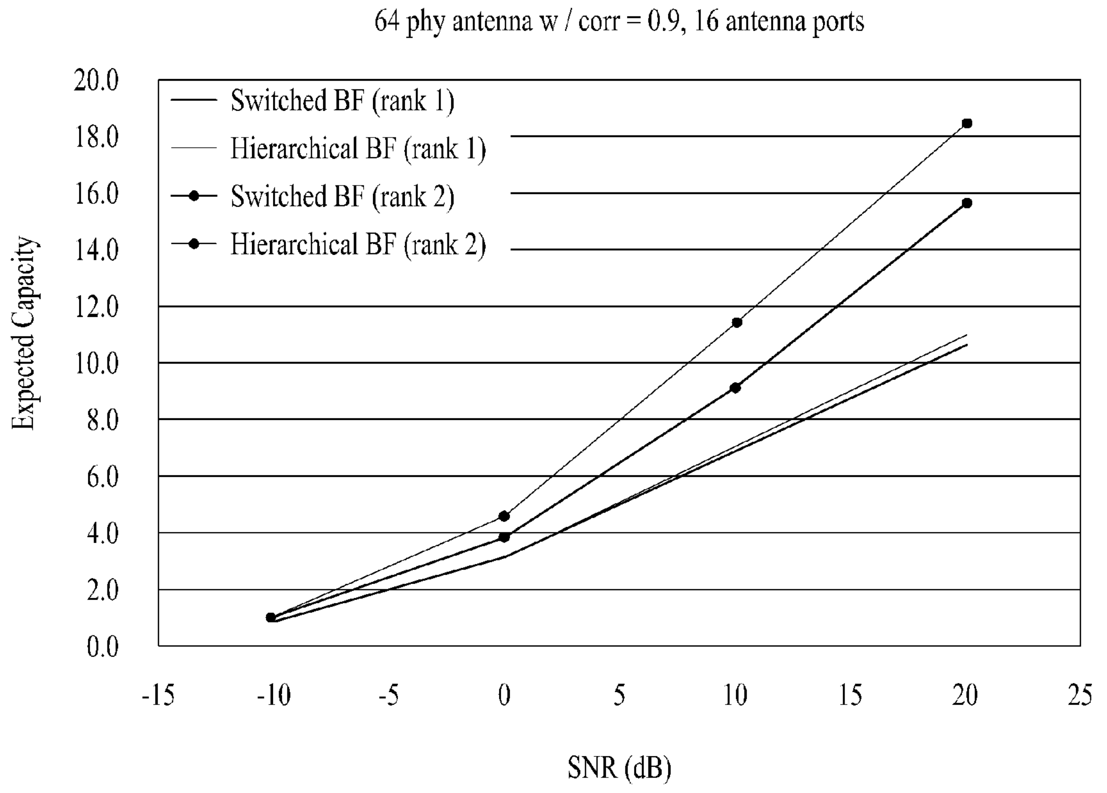

FIG. 17 is a graph illustrating another simulation result based on a hierarchical beamforming scheme according to the present invention.

Referring to FIG. 17, a simulation result is obtained on the assumption of high antenna correlation (it is assumed that correlation between antennas is 0.9) in a non-LOS environment. If rank is 2, the HBF assures throughput more excellent than that of the CBF. However, if rank is 1, the HBF obtains the same throughput as that of the CBF. Since beam adaptation for each rank is hierarchically managed in spatial multiplexing and beam for each rank is precoded using the codebook, the HBF may obtain such throughput gain if rank is 2.

Figure 18:
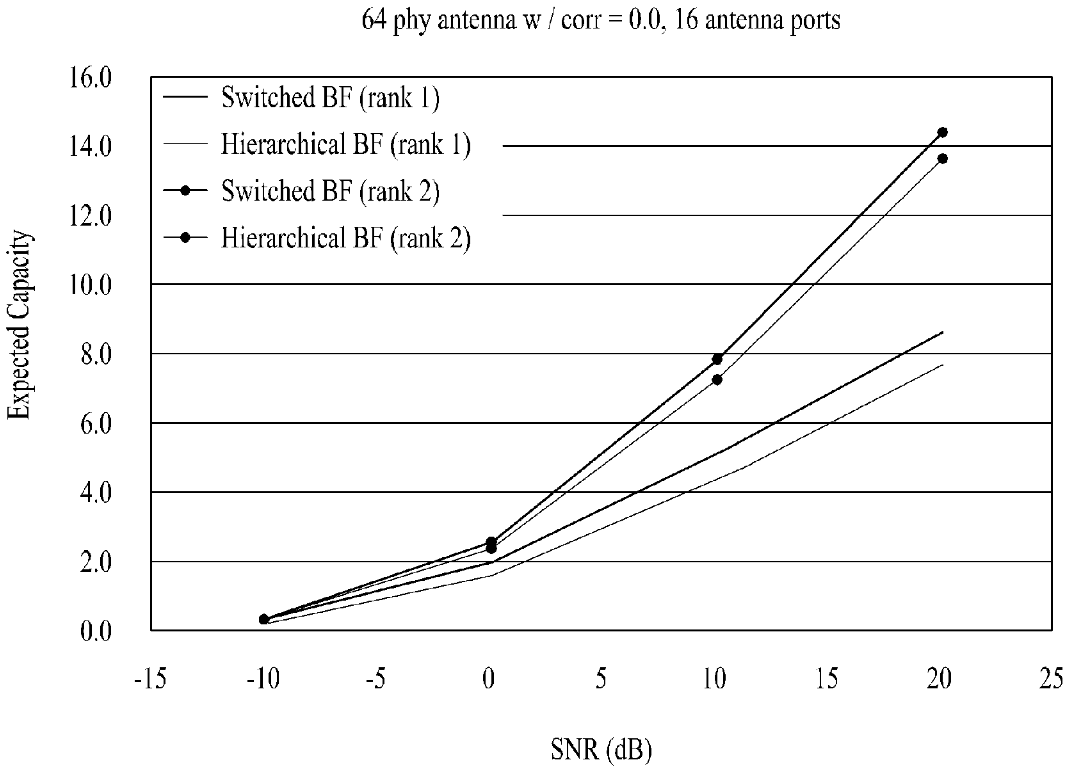

FIG. 18 is a graph illustrating other simulation result based on a hierarchical beamforming scheme according to the present invention.

Referring to FIG. 18, a simulation result is obtained on the assumption of low antenna correlation (it is assumed that correlation between antennas is 0) in a non-LOS environment. Since independence of each channel for performing spatial multiplexing is assured if antenna correlation is low, throughput corresponding to rank 2 is more excellent than that corresponding to rank is 1. However, since antenna correlation is low, a pattern of a beam is not generated normally, and correlation between the beam generated at the second step and the beam generated at the first step or subset concept is reduced. Accordingly, throughput of the HBF is more degraded than that CBF as shown in FIG. 18.

System to which the Present Invention May be Applied

Figure 19:
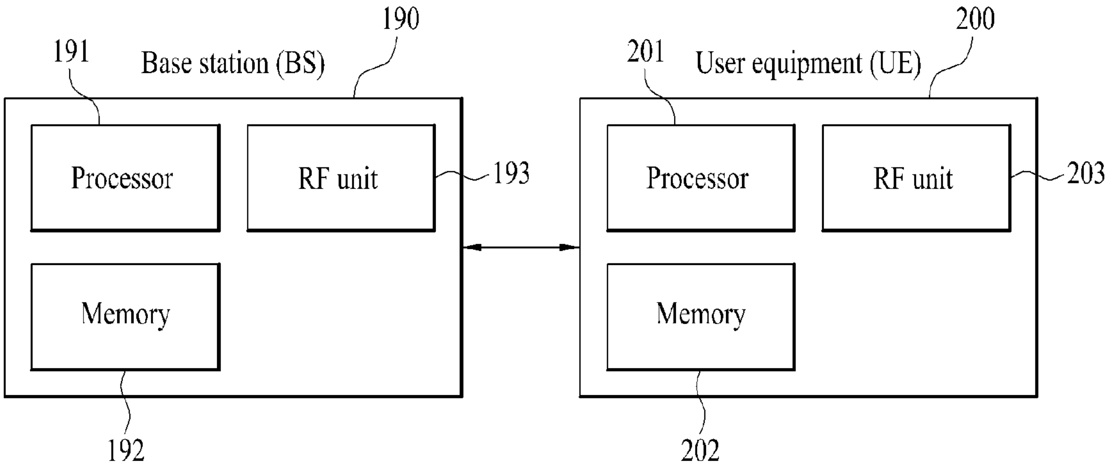
FIG. 19 is a block diagram illustrating a wireless communication system according to one embodiment of the present invention.

FIG. 19 is a block diagram illustrating a wireless communication system according to one embodiment of the present invention.

Referring to FIG. 19, the wireless communication system includes a base station 190 and a plurality of user equipments 200 located within the base station 190.

The base station 190 includes a processor 191, a memory 192, and a radio frequency (RF) unit 193. The processor 191 may be configured to implement functions, procedures and/or methods suggested in the present invention. Layers of a radio interface protocol may be implemented by the processor 191. The memory 192 is connected with the processor 191 and stores various kinds of information related to the operation of the processor 191. The RF unit 193 is connected with the processor 191 and transmits and/or receives a radio signal.

The user equipment 200 includes a processor 201, a memory 202, and a radio frequency (RF) unit 203. The processor 201 may be configured to implement functions, procedures and/or methods suggested in the present invention. Layers of a radio interface protocol may be implemented by the processor 201. The memory 202 is connected with the processor 201 and stores various kinds of information related to the operation of the processor 201. The RF unit 203 is connected with the processor 201 and transmits and/or receives a radio signal.

The memory 192, 202 may be located inside or outside the processor 191, 201, and may be connected with the processor 191, 201 by various means which are well known. Also, the base station 190 and/or the user equipment 200 may have a single antenna or multiple antennas.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments according to the present invention may be implemented by various means, for example, hardware, firmware, software, or their combination. If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

Although various methods according to the present invention have been described based on the 3GPP LTE system, they may equally be applied to various wireless access systems in addition to the 3GPP LTE system.

The invention claimed is:

1. A method for performing hierarchical beamforming in a wireless access system at a base station, the method comprising:

transmitting a plurality of first beams, to which different steering vectors are applied, to a user equipment through corresponding reference signals;

receiving feedback information including indexes of one or more beams from the user equipment; and transmitting a plurality of second beams, to which different steering vectors are applied, to the user equipment through corresponding reference signals by considering the feedback information, wherein the one or more beams are determined by estimating the plurality of first beams at the user equipment, wherein a number of the second beams is more than a number of the one or more beams, wherein angles of the second beams are determined using the indexes of the one or more beams.

2. The method according to claim 1, wherein the transmitting the plurality of second beams is repeated as much as a predetermined number of times.

3. The method according to claim 1, wherein the feedback information further includes at least any one of signal strength on the one or more beams, channel quality information (CQI), and precoding matrix indication (PMI).

4. The method according to claim 3, wherein, if the feedback information includes the PMI, the PMI is determined on the basis of the first beams or the second beams, or is determined on the basis of one or beams selected by the user equipment through signal strength of the first beams or the second beams.

5. The method according to claim 3, wherein, if the feedback information includes signal strength on a plurality of beams, angles of the second beams are determined at an unequal interval by considering signal strength on the plurality of beams.

6. The method according to claim 1, wherein the first beams or the second beams are generated using antenna ports only having a predetermined interval, generated using antenna ports grouped per a predetermined number, or generated by being grouped per a predetermined number.

7. The method according to claim 1, wherein the reference signal is a channel state information reference signal (CSI-RS).

8. A method for performing hierarchical beamforming in a wireless access system at a user equipment, the method comprising:

transmitting a plurality of first beams, to which different steering vectors are applied, to the base station through corresponding reference signals;

receiving feedback information including indexes of one or more beams from the base station; and transmitting a plurality of second beams, to which different steering vectors are applied, to the base station through corresponding reference signals by considering feedback information, wherein the one or more beams are determined by estimating the plurality of first beams at the user equipment, wherein a number of the second beams is more than a number of the one or more beams, wherein angles of the second beams are determined as using the indexes of the one or more beams.

9. The method according to claim 8, wherein the transmitting the plurality of second beams is repeated as much as a predetermined number of times.

10. The method according to claim 8, wherein the feedback information further includes at least any one of signal strength on the one or more beams, channel quality information (CQI), and precoding matrix indication (PMI).

11. The method according to claim 10, wherein, if the feedback information includes the PMI, the PMI is determined on the basis of the first beams or the second beams, or is determined on the basis of one or beams selected by the base station through signal strength of the beams.

12. The method according to claim 10, wherein, if the feedback information includes signal strength on a plurality of beams, angles of the second beams are determined at an unequal interval by considering signal strength on the plurality of beams.

13. The method according to claim 8, wherein the first beams or the second beams are generated using antenna ports only having a predetermined interval, generated using antenna ports grouped per a predetermined number, or generated by being grouped per a predetermined number.

14. The method according to claim 8, wherein the reference signal is a channel state information reference signal (CSI-RS).

15. A base station for performing hierarchical beamforming in a wireless access system, the base station comprising:

a radio frequency (RF) unit configured to transmit and receive a radio signal; and a processor, wherein the processor is configured to transmit a plurality of first beams, to which different steering vectors are applied, to a user equipment through corresponding reference signals, receives feedback information including indexes of one or more beams from the base station, and transmit a plurality of second beams, to which different steering vectors are applied, to the user equipment through corresponding reference signals by considering feedback information, and wherein the one or more beams are determined by estimating the plurality of first beams at the user equipment, wherein a number of the second beams is more than a number of the one or more beams, wherein angles of the second beams are determined using the indexes of the one or more beams.

16. A user equipment for performing hierarchical beamforming in a wireless access system, the user equipment comprising:

a radio frequency (RF) unit configured to transmit and receive a radio signal; and a processor, wherein the processor is configured to transmit a plurality of first beams, to which different steering vectors are applied, to the base station through corresponding reference signals, receives feedback information including indexes of one or more beams from the base station and transmit a plurality of second beams, to which different steering vectors are applied, to the base station through corresponding reference signals by considering feedback information, and wherein the one or more beams are determined by estimating the plurality of first beams at the user equipment, wherein a number of the second beams is more than a number of the one or more beams, wherein angles of the second beams are determined using the indexes of the one or more beams.

* * * * *